US007983196B2

(12) United States Patent
Yanagihara

(10) Patent No.: US 7,983,196 B2
(45) Date of Patent: Jul. 19, 2011

(54) TREE-TYPE BROADCAST SYSTEM, METHOD OF INSTRUCTING MODE SWITCH, BROADCAST DEVICE, AND BROADCAST PROCESS PROGRAM

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 218 days.

(21) Appl. No.: 12/320,820

(22) Filed: Feb. 5, 2009

(65) Prior Publication Data

US 2009/0238182 A1   Sep. 24, 2009

(30) Foreign Application Priority Data

Mar. 24, 2008   (JP) .................................. 2008-076625

(51) Int. Cl.
*H04L 12/28* (2006.01)
*H04L 12/56* (2006.01)
(52) U.S. Cl. ....................................... 370/255; 370/408
(58) Field of Classification Search ............ 370/254–25, 370/408
See application file for complete search history.

(56) References Cited

U.S. PATENT DOCUMENTS

| 7,185,077 B1 * | 2/2007 | O'Toole et al. ............ 709/223 |
| 7,573,835 B2 * | 8/2009 | Sahinoglu et al. ............ 370/255 |
| 2001/0027107 A1 * | 10/2001 | Shinozaki et al. ............ 455/456 |
| 2005/0213589 A1 * | 9/2005 | Shih ............................. 370/398 |
| 2006/0259607 A1 * | 11/2006 | O'Neal et al. ................ 709/223 |
| 2007/0133587 A1 | 6/2007 | Hibino et al. |
| 2007/0291679 A1 * | 12/2007 | Kawakami et al. ........... 370/328 |
| 2008/0215595 A1 * | 9/2008 | Suda ............................. 707/10 |
| 2008/0317250 A1 * | 12/2008 | Matsuo et al. ................ 380/279 |
| 2009/0180493 A1 * | 7/2009 | Hirano et al. ................. 370/464 |
| 2009/0198818 A1 * | 8/2009 | Kamei et al. ................. 709/227 |

FOREIGN PATENT DOCUMENTS

| JP | 2004246790 A | * | 9/2004 |
| JP | A-2006-33514 | | 2/2006 |
| WO | WO 2006120946 | * | 1/2006 |

* cited by examiner

*Primary Examiner* — Ayaz R Sheikh
*Assistant Examiner* — Mounir Moutaouakil
(74) *Attorney, Agent, or Firm* — Oliff & Berridge, PLC

(57) ABSTRACT

A broadcast device in a tree-type broadcast system forming plural hierarchy levels with the broadcast device located at the top and connecting the nodes so as to be sequentially transferred from higher to lower nodes, wherein
the nodes select a first mode determining a reconnection destination by acquiring node information from a server or a second mode determining a reconnection destination by acquiring node information of the reconnection destination candidate, and determines the reconnection destination by acquiring the node information according to the mode currently selected when the higher nodes are disconnected and the node except for the own is reconnected, and
the broadcast device monitors a load status of the server, and broadcasts to switch selection to the second mode to thereby enable sequential transfer of the switch instruction from the higher to the lower nodes when a monitor level becomes a threshold level or more.

10 Claims, 18 Drawing Sheets

⊘ → LOCATION INFORMATION OF BROADCAST STATION 10
● → LOCATION INFORMATION OF NODE N1
○ → LOCATION INFORMATION OF NODE N2

FIG. 7

| MONITOR ITEM | MONITOR MAIN BODY | MONITOR SUBJECT | MONITOR METHOD |
|---|---|---|---|
| CPU OCCUPANCY RATE | CONNECTION DESTINATION INTRODUCTION SERVER | CONNECTION DESTINATION INTRODUCTION SERVER | PERIODICAL PUBLICATION OF OS STANDARD EQUIPPED SYSTEM COMMAND |
| LIFE-OR-DEATH STATUS | BROADCAST STATION | CONNECTION DESTINATION INTRODUCTION SERVER | MONITORING TIMEOUT IN MONITOR MESSAGE SENDING/RECEIVING PROTOCOL |
| INCREASE TENDENCY OF NODE CONNECTION NUMBER PER UNIT TIME | CONNECTION DESTINATION INTRODUCTION SERVER | CONNECTION DESTINATION INTRODUCTION SERVER | CHANGE IN RECEPTION AMOUNT OF TOPOLOGY PARTICIPATION REPORT MESSAGE |
| PACKET RECEPTION RATE OF ROUTER DEVICE | CONNECTION DESTINATION INTRODUCTION SERVER | ROUTER DEVICE CONNECTED WITH CONNECTION DESTINATION INTRODUCTION SERVER | ACQUIRING PACKET RECEPTION RATE OF ROUTER DEVICE THROUGH SNMP |
| START TIME OF POPULAR BROADCAST SERVICE | CONNECTION DESTINATION INTRODUCTION SERVER | SYSTEM TIMER | COMPARING INPUT INFORMATION OF SYSTEM OPERATOR WITH SYSTEM TIMER |

TREE-TYPE BROADCAST SYSTEM, METHOD OF INSTRUCTING MODE SWITCH, BROADCAST DEVICE, AND BROADCAST PROCESS PROGRAM

The entire disclosures of Japanese Patent Application No. 2008-076625 filed on Mar. 24, 2008 including the specification, claims, drawings and summary is incorporated herein by reference in its entirety.

BACKGROUND OF THE INVENTION

1. Field of the Invention

The present invention relates to a peer-to-peer (P2P) type communication system including a plurality of node devices mutually communicable through a network.

2. Discussion of Related Art

There is known a technology called "Application Layer Multicast (ALM)" where content data stream is relayed and delivered while a delivery (broadcast) route of content data is managed in an application layer. For example, in a tree-type broadcast system which is disclosed by Patent Document 1, plural node devices participating in the system form a plurality of hierarchy levels with a broadcast station (e.g. broadcast device) ranked as a top and are connected in a tree-like form through a communication means at the same time. Content data broadcasted (streamed) from the broadcast station are sequentially transferred from node devices in an upper hierarchy level to node devices in a lower hierarchy level.

In such a tree-type broadcast system, there exist two methods: a control method that a connection destination introduction server as a center equipment centrally controls an entire tree topology (delivery topology) (hereinafter referred to as "ALM control method based on hybrid type P2P") and a control method that an individual node device dispersively controls partial tree topology (hereinafter referred to as "ALM control method based on pure type P2P").

[Patent Document 1] Japanese Unexamined Patent Publication No. 2006-33514

SUMMARY OF THE INVENTION

Meanwhile, in the ALM control method based on hybrid type P2P, the tree topology is efficiently enabled to produce and manage. However, there is a problem in scalability and fault resistance of connection destination introduction server managing the topology. Typically, in an operation of the ALM control method based on hybrid type P2P, a system operator estimates the maximum number of participation of audience user and prepares a server and a router device which have appropriate performance. However, when the maximum participation number is erroneously estimated or an unexpected fault occurs in the connection destination introduction server, it requires much time for reconnection process in the node device participating in the tree-type broadcast system or reconnection itself cannot be processed. As a result, reconnection of the other node device is provoked or many node devices repeat reconnection processes in the system. Therefore, a lot of loads are put on the server and the router device.

On the contrary thereto, although the ALM control method based on pure type P2P is advantageous in scalability and fault resistance, there is a problem that the topology becomes unstable due to delay of topology information transmission when a node device frequently withdraws and re-participants.

Thus, the ALM control method based on hybrid type P2P and the ALM control method based on pure type P2P have advantages and disadvantages respectively.

The present invention is provided in consideration of the above problems. An object of the present invention is to provide a tree-type broadcast system, a method of instructing mode switch, a broadcast device, and a broadcast process program which enable to control the most appropriate topology while taking advantage of respective advantages of the ALM control method based on hybrid type P2P and the ALM control method based on pure type P2P at the same time.

In order to solve the above problems, according to one aspect of the present invention, there is provided a broadcast device in a tree-type broadcast system formed by participation of a plurality of node devices that are fabricated to form a plurality of hierarchy levels while locating the broadcast device at a top position of the tree-type broadcast system and connecting the node devices in a tree-like shape through a communication means to enable content data broadcasted by the broadcast device are sequentially transferred from the node devices in an upper hierarchy level to the node devices in a lower hierarchy level, the node devices including:

a mode selection means for selecting either one of modes of a first mode and a second mode, the first mode determining a reconnection destination by acquiring node information to be the reconnection destination from a server device which manages a connection mode between the node devices in the tree-type broadcast system, the second mode determining a reconnection destination by acquiring node information of the node device to be the reconnection destination candidate from any one of the node devices participating in the tree-type broadcast system; and a reconnection processing means for determining the reconnection destination by acquiring the node information according to the mode currently selected in a case where the node device in the upper hierarchy level, which the own node device is currently connected to, is disconnected and the node device other than the own node device is reconnected, the broadcast device in the tree-type broadcast system including:

a load status monitor means for monitoring a load status of the server device; and a switch instruction information broadcast means for broadcasting switch instruction information for respectively instructing the node devices to switch selection over to the second mode to thereby enable sequential transfer of the switch instruction information from the node devices in the upper hierarchy level to the node devices in the lower hierarchy level, in a case where a monitor level of the load status becomes a threshold level or more.

According to the present invention, the broadcast device monitors a load status of the server device and broadcasts so as to subsequently transfer switch instruction information for instructing respective node devices to switch selection to the second mode, from a node device at an upper hierarchy level to a node device at a lower hierarchy level, in a case where the monitor level of the load status exceeds the threshold level. Such a configuration enables respective node devices to switch from the first mode to the second mode, for example, with a predictor of an abnormal status as a trigger, to avoid an excessive load on the center equipment. Therefore, it is possible for the broadcast device to carry out the most appropriate topology control while utilizing respective advantages of the ALM control method based on hybrid type P2P and the ALM control method based on pure type P2P.

BRIEF DESCRIPTION OF THE DRAWINGS

FIG. 7 is a view showing an example of load factor subject to be monitored in the broadcast station 10.

DETAILED DESCRIPTION OF THE PREFERRED EMBODIMENTS

Figure 1:
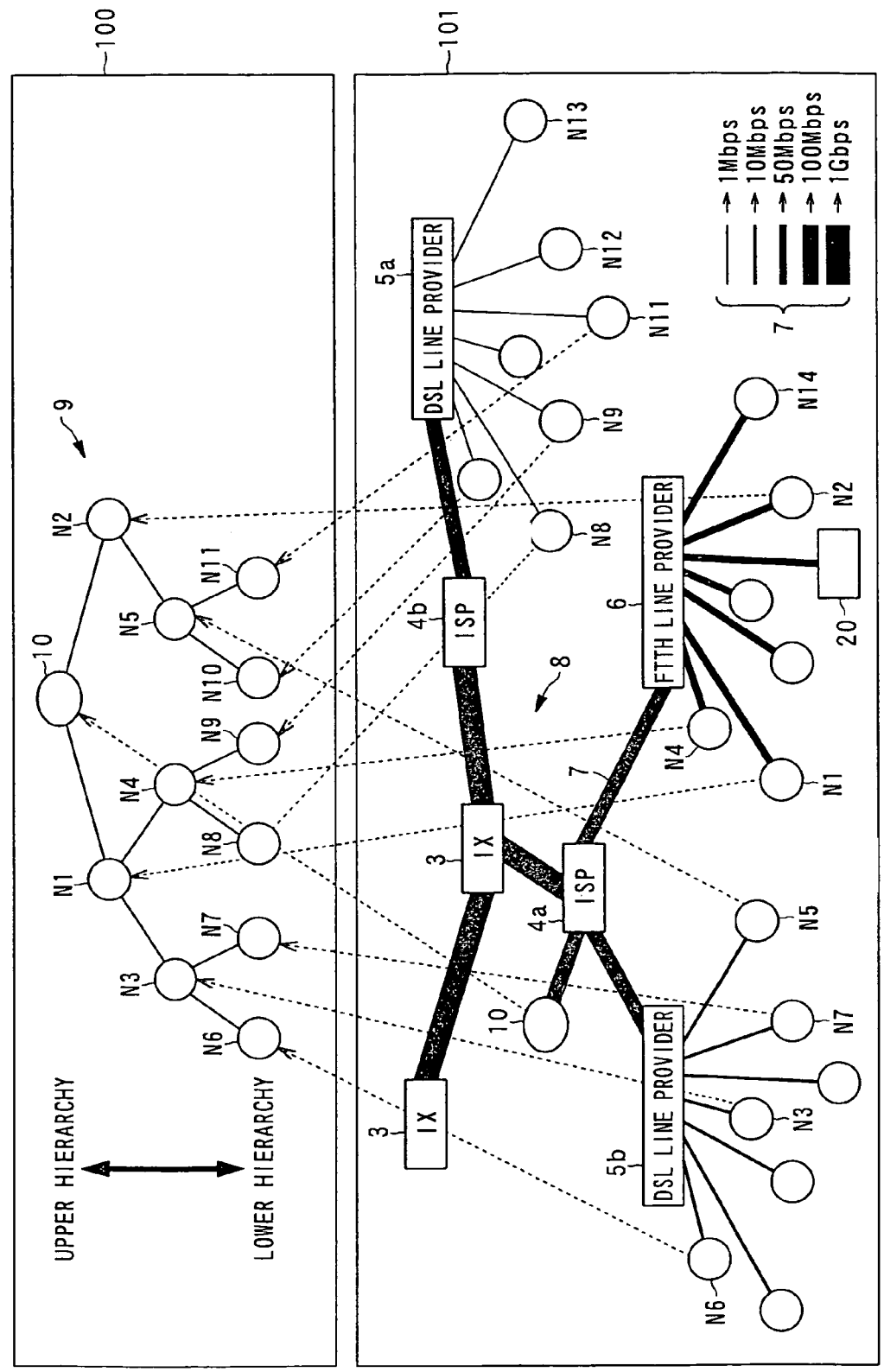
FIG. 1 is a view showing an example of connection status of respective node devices in a tree-type broadcast system according to the present embodiment.

Hereinafter, each designation of numerical reference in the drawings is typically as follows:
8 Network;
9 Overlay network;
10 Broadcast station;
20 Connection destination introduction server;
101, 201, 301a Main power;
301b Auxiliary power;
102, 202, 302 Main memory device;
103, 203, 303 Hard disk device;
104, 204, 304 CPU;
105, 205, 305 Network interface;
106, 206, 306 Peripheral device control chip;
107, 207, 307 Video chip;
108, 308 Audio chip;
109, 208 Keyboard;
110, 209 Mouse;
111, 210 Display;
112, 312 Built-in speaker;
113, 211, 313 System bus;
114, 212, 314 Router;
309 Infrared port;
310 Remote controller for user input;
311 Built-in display;
Nn Node; and
S Tree-type broadcast system Hereinafter, an embodiment of the present invention is explained based on figures.

[1. Configuration and the like of Tree-type Broadcast System]

First, with reference to FIG. 1 and the like, a schematic configuration and a function of a tree-type broadcast system according to an embodiment of the present invention are explained.

FIG. 1 is a view showing an example of connection status of respective node devices in a tree-type broadcast system according to the present embodiment.

As shown in lower frame 101 in FIG. 1, a network (communication network in real world) 8 of the Internet and the like are constructed by an internet exchange (IX) 3, internet service providers (ISP) 4a and 4b, digital subscriber line (DSL) providers (or device thereof) 5a and 5b, fiber to the home line provider (or device thereof) 6, and communication line (e.g. a phone line or an optical cable) 7 and the like. Here, in the network (a communication network) 8 of the example of FIG. 1, a router for transferring data (packet) is appropriately inserted but not shown in the figures.

In such a network 8, plural node devices (hereinafter, referred to as "nodes") Nn (n=any one of 1, 2, 3 . . . ) are connected. In addition, an inherent manufacturing number and an IP (Internet Protocol) address are assigned to each of the node Nn. Such manufacturing numbers and IP addresses do not overlap among plural nodes.

Then, the tree-type broadcast system S according to the present embodiment is a peer to peer type network system formed (configured) by participation of any of plural nodes Nn among these nodes Nn, as shown in the upper frame 100 of FIG. 1. The plural nodes Nn participating in the system S (i.e. tree topology) form plural hierarchy levels with a broadcast station (broadcast device) 10 ranked as a top of the hierarchy levels and are connected in a tree form through a network 8. Here, a network 9 shown in an upper frame 100 of FIG. 1 is an overlay network 9 (a logical network) including a virtual link formed by use of an existing network 8.

In such the tree-type broadcast system S, content data broadcasted (e.g. streamed) by a broadcast station (broadcast device) 10 are sequentially transferred (by e.g. a stream relay process) from nodes Nn in the upper hierarchy level (hereinafter referred to as "upstream") to nodes Nn in the lower hierarchy level (hereinafter referred to as "downstream").

Further, the respective nodes Nn participating in the tree-type broadcast system S monitor the status of receiving stream from upstream nodes Nn. Triggered by the status where, for example, a reception quality (audience quality) becomes lower than a predetermined quality, the node Nn cuts off the connection to the upstream node Nn currently connected to the own and reconnects to another node Nn (i.e. changing a connection destination). Here, as evaluation criteria of reception quality, an average packet rate and a packet loss rate for a past predetermined period can be employed. Further, with respect to the above trigger of reconnection, the node may reconnect when the downstream node Nn receives withdrawal event notification from the upstream node Nn withdrawing from the tree-type broadcast system S.

Then, in the tree-type broadcast system S according to the present embodiment, two control methods—the ALM control method based on hybrid type P2P and the ALM control method based on pure type P2P—are switched by an arbitrary trigger and employed. In the ALM control method based on hybrid type P2P, respective nodes Nn acquire location information of a node Nn (node information such as IP address and port number) to be a reconnection destination candidate from a connection destination introduction server 20 being a server device managing connection status between nodes Nn in the tree-type broadcast system S, thereby determining a reconnection destination (such method is referred to as "a first mode (a control mode based on hybrid P2P)". On the other hand, in the ALM control method based on pure type P2P, respective nodes Nn acquire a location information of a node Nn to be a reconnection destination candidate from any one of nodes Nn participating in the tree-type broadcast system S, thereby determining a reconnection destination (referred to as "a second mode (a control mode based on pure P2P)").

Here, reconnection of the node Nn in the ALM control method based on hybrid type P2P and in the ALM control method based on pure type P2P will be explained respectively.

[1-1. ALM Control Method Based on Hybrid Type P2P]

Figure 2:
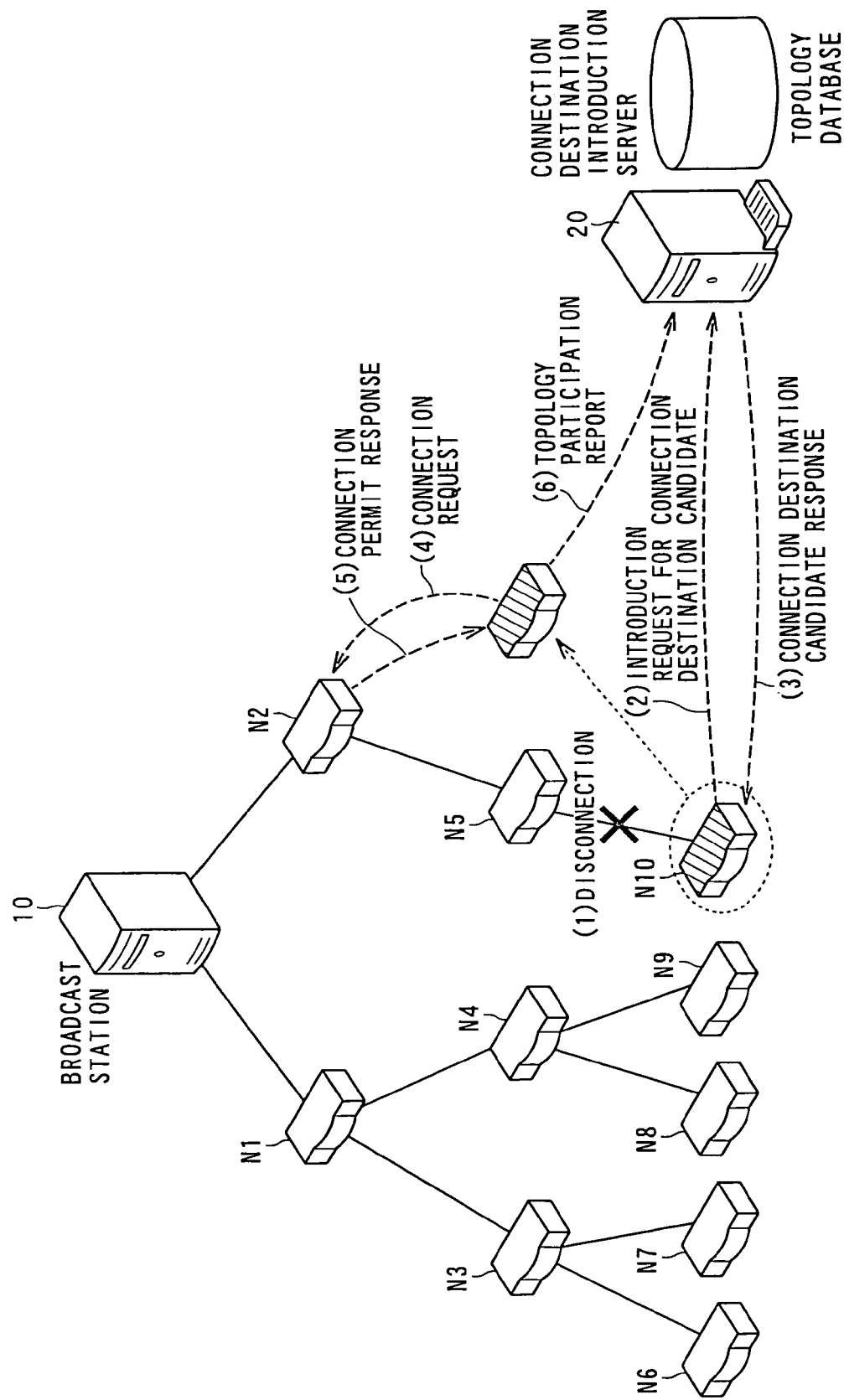
FIG. 2 is a view showing a status where a node N10 reconnects to another node N2 in an ALM control method based on hybrid type P2P.

FIG. 2 is a view showing a status where a node N10 reconnects to another node N2 in an ALM control method based on hybrid type P2P.

In an example of FIG. 2, in a case where node N1 reconnects on a tree topology in the tree-type broadcast system S, due to, for example, deterioration of stream reception quality, the node N10 publishes a connection abandon request to an upstream node N5 currently being connected, and then cuts off the connection to the upstream node N5 ((1) disconnection).

Subsequently, the node N10 sends a connection destination candidate (upstream node candidate) introduction request message to the connection destination introduction server 20 ((2) connection destination candidate introduction request). The connection destination introduction server 20 searches nodes Nn connectable to the downstream side from topology management information which is managed inside, and returns a connection destination candidate response message including location information (node information such as IP address, port number) of one or more connection destination candidates thus searched ((3) connection candidate response).

Next, the node N10 selects (determines), for example, node N2 which meets the conditions (or at random), from connection destination candidates acquired from the connection destination introduction server 20, and sends a connection request message to the node N2 ((4) connection request). In a case where a connection permit response message is returned from the node N2 ((5) connection permit response), connection is generated.

Then, the node N10 sends a stream start request message to the node N2. In response thereto, receiving a content data stream delivered from the node N2 is started to receive.

Finally, the node N10 sends a topology participation report message to the connection destination introduction server 20 ((6) topology participation report) to complete a reconnection process.

[1-2. ALM Control Method Based on Pure Type P2P]

According to the present embodiment, in an ALM control method based on pure type P2P, respective nodes Nn cash a node group (including broadcast station 10) near the highest rank (top) in the tree topology as a node to be a search origin of a connection destination candidate (hereinafter referred to as "search origin node"). Then the connection destination candidate is searched toward the downstream with the search origin node as an origin, and thus searched node Nn is reconnected. This method is exemplified. Here, the search origin node is a device which is located near the highest rank of the tree topology and stably operates for long time, and only the broadcast station 10 falls under this case in an initial status.

Here, according to this method, a subject that an arbitrary node Nn publishes an inquiry (connection destination candidate search request) to receive an introduction of a reconnection destination is not the connection destination introduction server 20 but the search origin node.

This method includes a step of cashing a search origin node, a step of searching connection destination candidate through a search origin node, and a reconnection step.

[1-2-1. Step of Cashing Search Origin Node]

FIGS. 3 and 4 are views showing a status of cashing a search origin node.

Figure 3A:
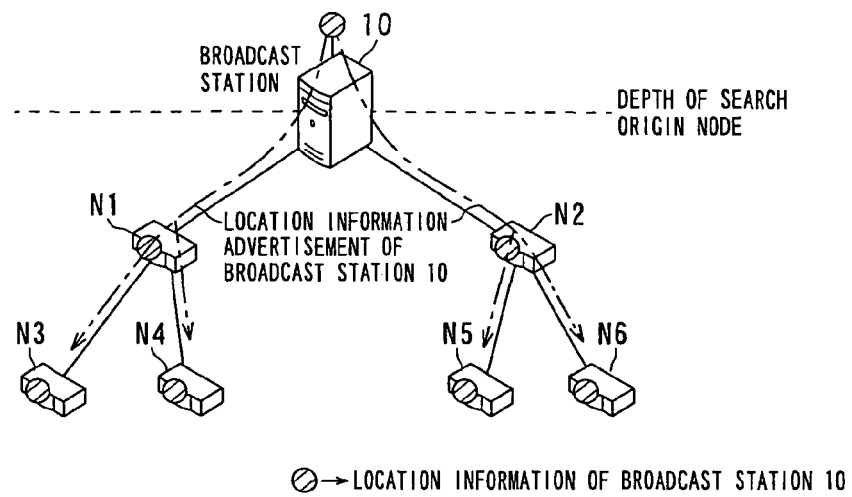
FIG. 3 is a view showing a status of cashing a search origin node.
Figure 3B:
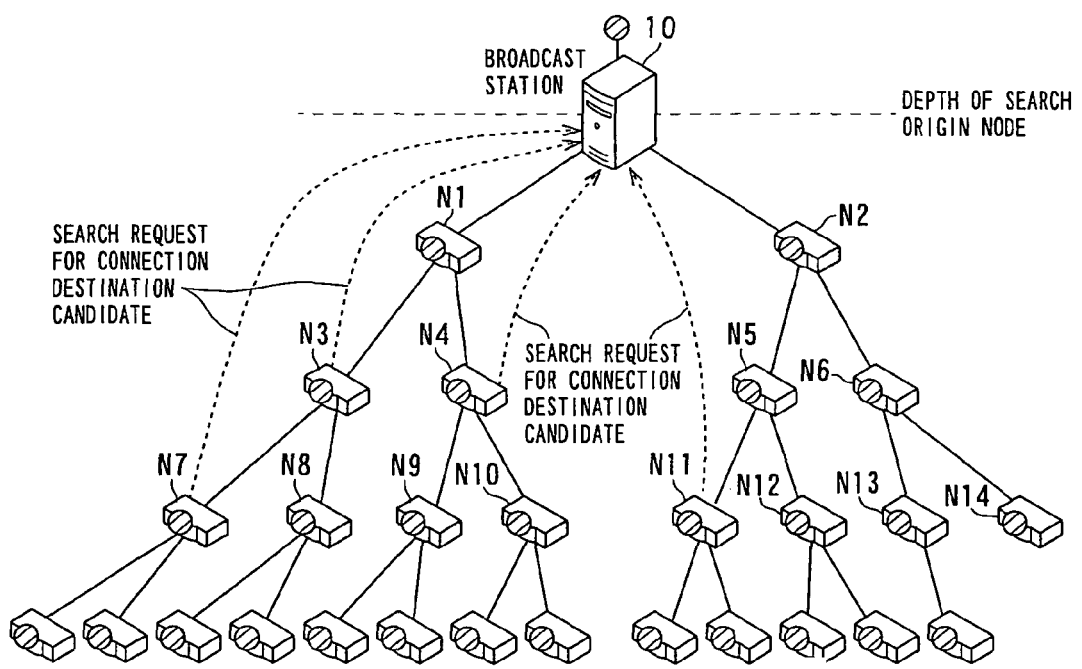

For example in a small scale of tree, the search origin node is only the broadcast station 10 as shown in FIG. 3(A), and a subject depth of the search origin node is the highest hierarchy level. The broadcast station 10 being the search origin node broadcasts (multicast-delivering) an advertisement message including own location information (IP address, port number and the like) so as to sequentially transfer from an upstream node Nn to a downstream node Nn, through a broadcast route (delivery route) of tree topology. The respective nodes Nn thus receiving the advertisement message memorize the location information of the broadcast station 10 being the search origin node as a form of cashing. In a case of searching a reconnection destination candidate, the node Nn sends to the search origin node a connection destination candidate search request message (an example of search information) for instructing to search a connection destination candidate (connection destination candidate search request), as shown in FIG. 3(B).

Figure 4A:
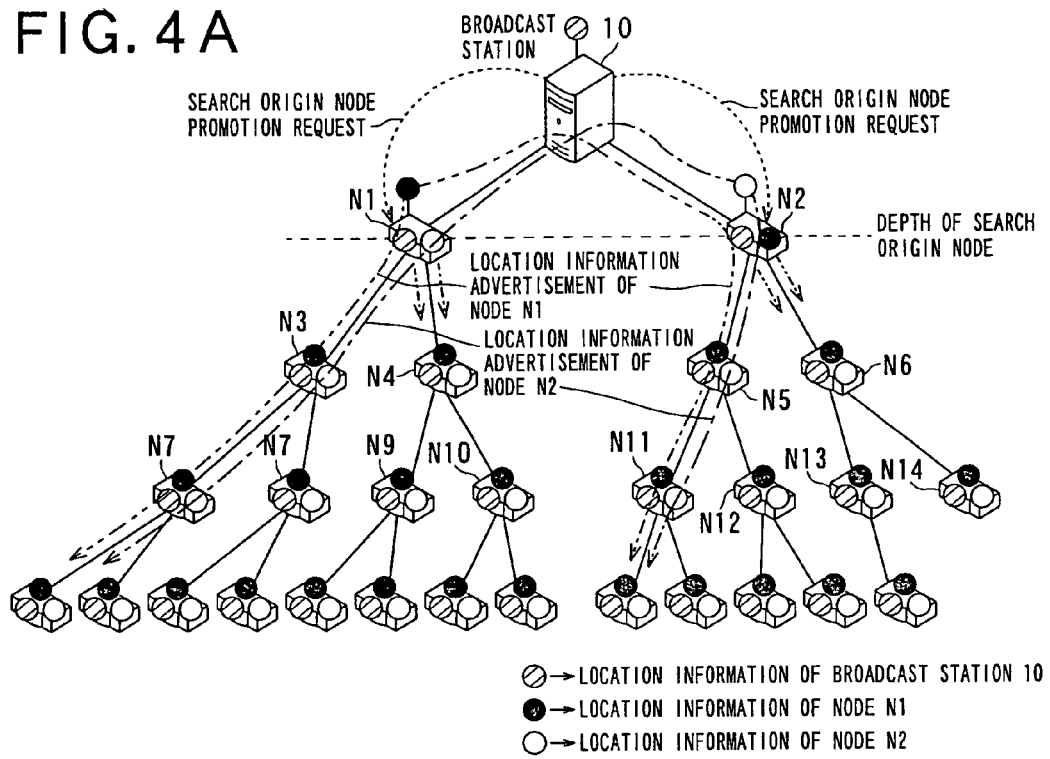
FIG. 4 is a view showing a status of cashing a search origin node.

However, when a total number of connection destination candidate search request messages which are published per unit time from respective nodes Nn increases due to increase of the number of nodes participating in the tree topology, probability that the connection destination candidate search request messages focus on the search origin node to be the message sending destination becomes high. Therefore, the search origin node monitors an amount of the connection destination candidate search request messages published to the own node per unit time. In a case where the message amount exceeds allowance value, the search origin node sends the search origin node promotion request message to be a new search origin node to the nodes Nn (nodes N1 and N2 in an example of FIG. 4(A)) which are connected (directly connected) to the downstream side (search origin node promotion request), as shown in FIG. 4(A). In a manner similar thereto, in a case where the reception destination candidate search request message per unit time exceeds the allowance value, the node Nn newly promoting to the search origin node also sends a search origin node promotion request message to the node Nn connected to the downstream side. When such operations are repeated, a depth of the search origin node gradually increases (descending toward the lower hierarchy level), and the number of the search origin nodes increases.

Figure 4B:
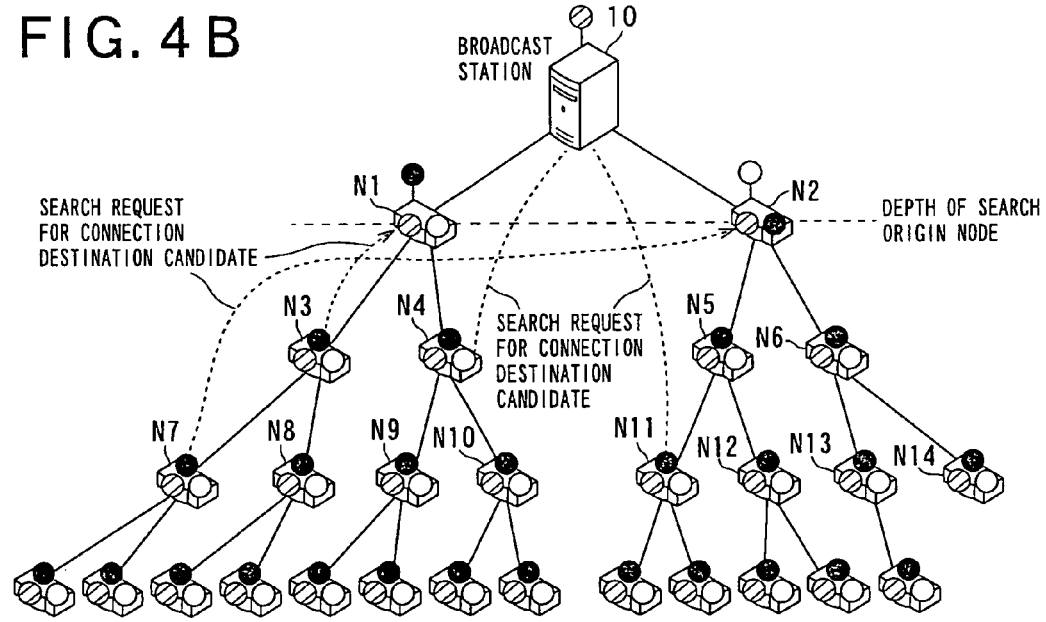

Thus the node Nn newly promoting to a search origin node transfers an advertisement message to the broadcast station 10 once through a broadcast route of the tree topology, as shown in FIG. 4(A), in order to advertise the location information of the own node (node information such as IP address and port number) at predetermined time intervals (e.g. regularly). The broadcast station 10 receiving the message puts together the advertisement messages and broadcasts the advertisement message so as to be sequentially transferred from the upstream node Nn to the downstream node Nn through the broadcast route of the tree topology. The respective nodes Nn receiving thus advertisement message memorizes a list of location information of search origin node described in the advertisement message in a form of cashing until the advertisement message is received next. In a case of searching a reconnection destination candidate, the respective nodes Nn sends a connection destination candidate search request message to the search origin node (connection destination candidate search request). According to such a mechanism, the connection destination candidate search request messages which the respective nodes Nn publish for reconnection are dispersed into plural search origin nodes as shown in FIG. 4(B).

[1-2-2. Step of Searching and Reconnecting Connection Destination Candidate through Search Origin Node]

FIG. 5 is a view showing a status where a node N7 reconnects to another node N14 in an ALM control method based on pure type P2P.

Figure 5A:
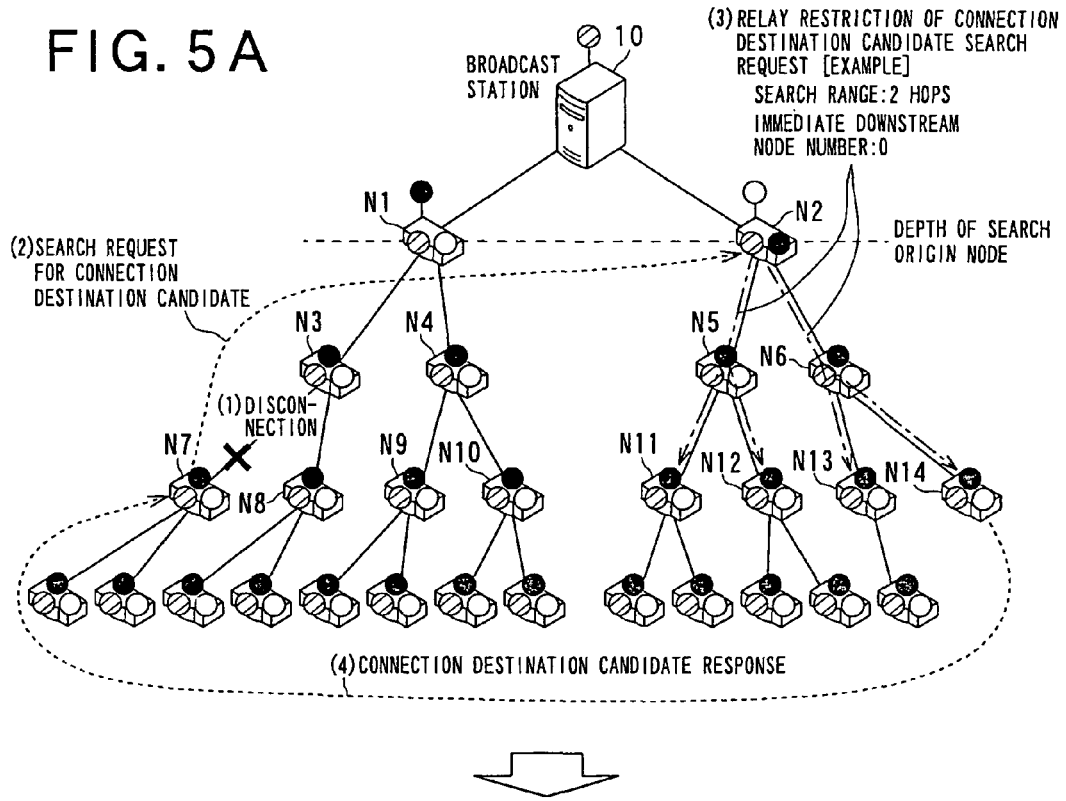
FIG. 5 is a view showing a status where a node N7 reconnects to another node N14 in an ALM control method based on pure type P2P.

In an example of FIG. 5(A), in a case where a node N7 carries out reconnection on the tree topology of the tree-type broadcast system S, for example, due to deterioration of the stream reception quality, the node N7 publishes a connection abandon request to an upstream node N3 currently connected to cut off connection to the upstream node N3 ((1) disconnection).

Next, the node N7 sends a connection destination candidate search request message to any node Nn (being a node N2 in an example of FIG. 5(A)) among search origin nodes where location information is cashed in the own node ((2) connection destination candidate search request). Upon receipt of the connection destination candidate search request message, the search origin node relays the message to the node Nn connected to downstream side ((3) relay of connection destination candidate search request). The connection destination candidate search request message thus sent (relayed) from the search origin node is sequentially transferred to nodes Nn in a predetermined range (search range: 2 hops, in this example) existing downstream with the search origin node as an origin.

Subsequently, upon receipt of the connection destination candidate search request message, respective nodes Nn (including the search origin node) refer to restriction described in a message payload unit. Only in a case where the own node can be a connection destination candidate, the connection destination candidate response message (including node information such as own IP address and port number) is returned to a node Nn being a source of the connection destination candidate search request ((4) connection destination candidate response). In the example of FIG. 5(A), although a node N14 falls under the connection destination candidate based on the restriction, plural nodes Nn may be the candidates.

Figure 5B:
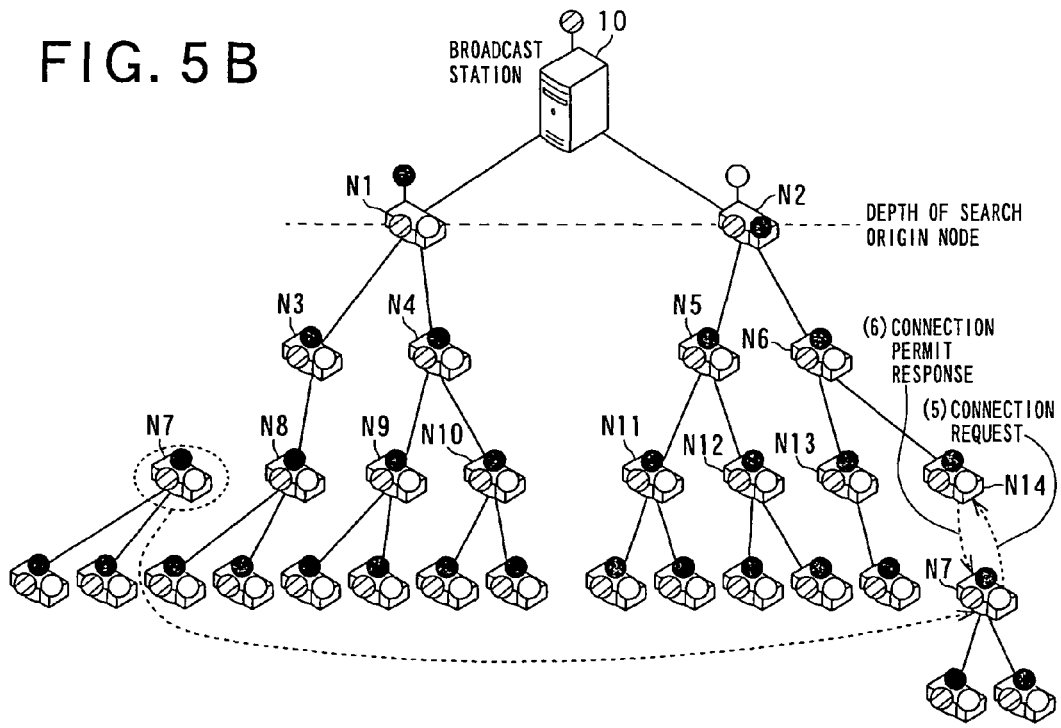

In an example of FIG. 5(B), the node N7 receiving the connection destination candidate response message selects (determines), for example, the node N14 which meets the condition (or at random) among acquired connection destination candidates, and sends the connection request message to the node N14 ((5) connection request). In a case where the node N7 receives a connection permit response message from the node N14 ((6) connection permit response), connection is generated.

Then the node N7 sends a stream start request message to the node N14, and starts receiving of a content data stream delivered.

Finally, the node N7 sends a topology participation report message to the connection destination introduction server 20, and finishes a reconnection process.

[1-3. Configuration and the like of Broadcast Station 10]

Figure 6:
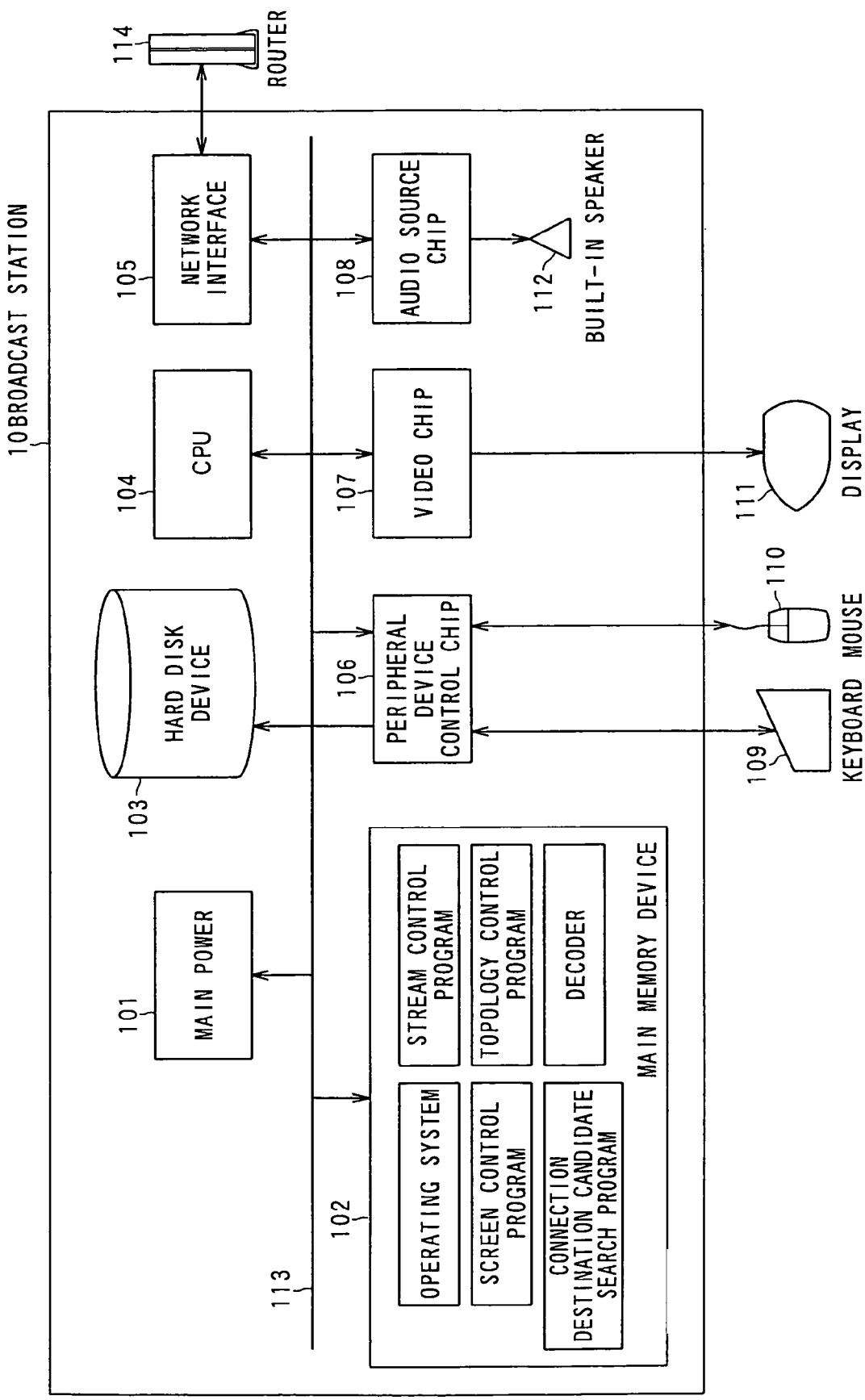
FIG. 6 is a view showing an example of a schematic configuration of a broadcast station 10.

Next, with reference to FIG. 6, a configuration and a function of a broadcast station 10 are explained.

FIG. 6 is a view showing an example of a schematic configuration of a broadcast station 10.

As shown in FIG. 6, the broadcast station 10 is configured by including a main power 101, a main memory device 102, a hard disk device 103, CPU 104, a network interface 105, a peripheral device control chip 106, a video chip 107, an audio source chip 108, a built-in speaker 112, and the like. Further, the broadcast station 10 is connected to a network 8 through a router 114. Here, any node Nn other than special broadcast server may be applicable as such the broadcast station 10.

Further, the main power 101, the main memory device 102, the hard disk device 103, the CPU 104, the network interface 105, the peripheral device control chip 106, the video chip 107, and the audio source chip 108 are mutually connected through a system bus 113. Further, a keyboard 109 and a mouse 110 are connected to the periphery device control chip 106, and a display 111 is connected to the video chip 107.

The main memory device 102 is configured by including RAM, ROM and the like and memorizes an operating system, a stream control program, a screen control program, a topology control program, a connection destination candidate search program, a decoder (program) and the like. In addition, the main memory device 102 memorizes a node management table, and location information (IP address, port number and the like) of the node Nn connected downstream of the broadcast station 10 is registered in the node management table. Further, the main memory device 102 has a buffer memory (e.g. ring buffer).

Further, broadcast content data is recorded in the hard disk device 103.

The CPU 104 packetizes content data recorded in, for example, the hard disk device 103 according to (i.e. by executing programs) various programs (including a broadcast process program of the present invention) which are memorized in the main memory device 102, and broadcasts (streaming) them to downstream nodes Nn registered on the node management table. Further, the CPU 104 functions as a node information broadcast means, a load status monitor means, a switch instruction information broadcast means, or the like of the present invention by executing the above programs.

Further, as described above, the CPU 104 as a node information broadcast means carries out a broadcast process of broadcasting so as to sequentially transferring an advertisement message including location information of a search origin node from the downstream node Nn to the upstream node Nn through a broadcast route of the tree topology, at predetermined time intervals (e.g. periodically).

Further, the CPU 104 as the load status monitor means monitors the load status of the connection destination introduction server 20. In a case where a monitor level of the above load status exceeds a threshold level, the CPU 104 as the switch instruction information broadcast means carries out a broadcast process where a switch instruction message (an example of switch instruction information) for instructing to switch a selection from a first mode (a control mode based on hybrid type P2P) to a second mode (a control mode based on pure type P2P) is sequentially transferred from the upstream node Nn to the downstream node Nn through the broadcast route of the tree topology.

Here, "a load of the connection destination introduction server 20" can be judged based on, for example, usage rate of the connection destination introduction server 20, life-or-death state, increase tendency of node connection frequency per unit time, packet reception rate of the router device connected by the connection destination introduction server 20, start time of popular broadcast service, and the like. These are factors placing or likely to place a load on center equipment which has the connection destination introduction server 20.

FIG. 7 is a view showing an example of load factor subject to be monitored in the broadcast station 10.

Although the broadcast station 10 judges whether or not the switch instruction message is broadcasted to the node Nn, a main body for collecting monitor data is different according to monitor items. For example, as shown in FIG. 7, although the broadcast station 10 directly monitors "life-or-death state" of the connection destination introduction server 20, with respect to "CPU usage rate" of the connection destination introduction server 20, the broadcast station 10 indirectly obtains information monitored by the connection destination introduction server 20.

The broadcast station 10 regularly monitors a load status of the connection destination introduction server 20. Before it becomes excessive load status, the broadcast station 10 broadcasts a switch instruction message to change an operation mode from a first mode to a second mode to nodes Nn extending toward downstream of the broadcast station 10 when a measurement value as a monitor level exceeds a threshold level. In this way, respective nodes Nn are enabled to shift from the ALM control method based on hybrid type P2P to the ALM control method based on pure type P2P with a predictor of abnormal status as a trigger. Therefore, it is possible to avoid excessive load status on the center equipment.

On the other hand, in a case where the above monitor level of the load status falls below the threshold level for a predetermined period, the CPU 104 as a switch instruction information broadcast means carries out a broadcast process where a switch instruction message for instructing to switch the above-mentioned second mode to the above-mentioned first mode to respective nodes Nn is broadcasted so as to sequentially transfer from the upstream node Nn to the downstream node Nn. That means the broadcast station 10 broadcasts a switch instruction message for instructing to return the operation mode from the second mode to the first mode to the nodes Nn extending downward. In this way, it becomes possible to carry out an appropriate topology control again. Specifically, in a case where a broadcast service over 10,000 nodes is operated, influence of topology variation on the center equipment remarkably appears. Therefore, it is expected to be effective for operating server equipment safely.

Figure 8:
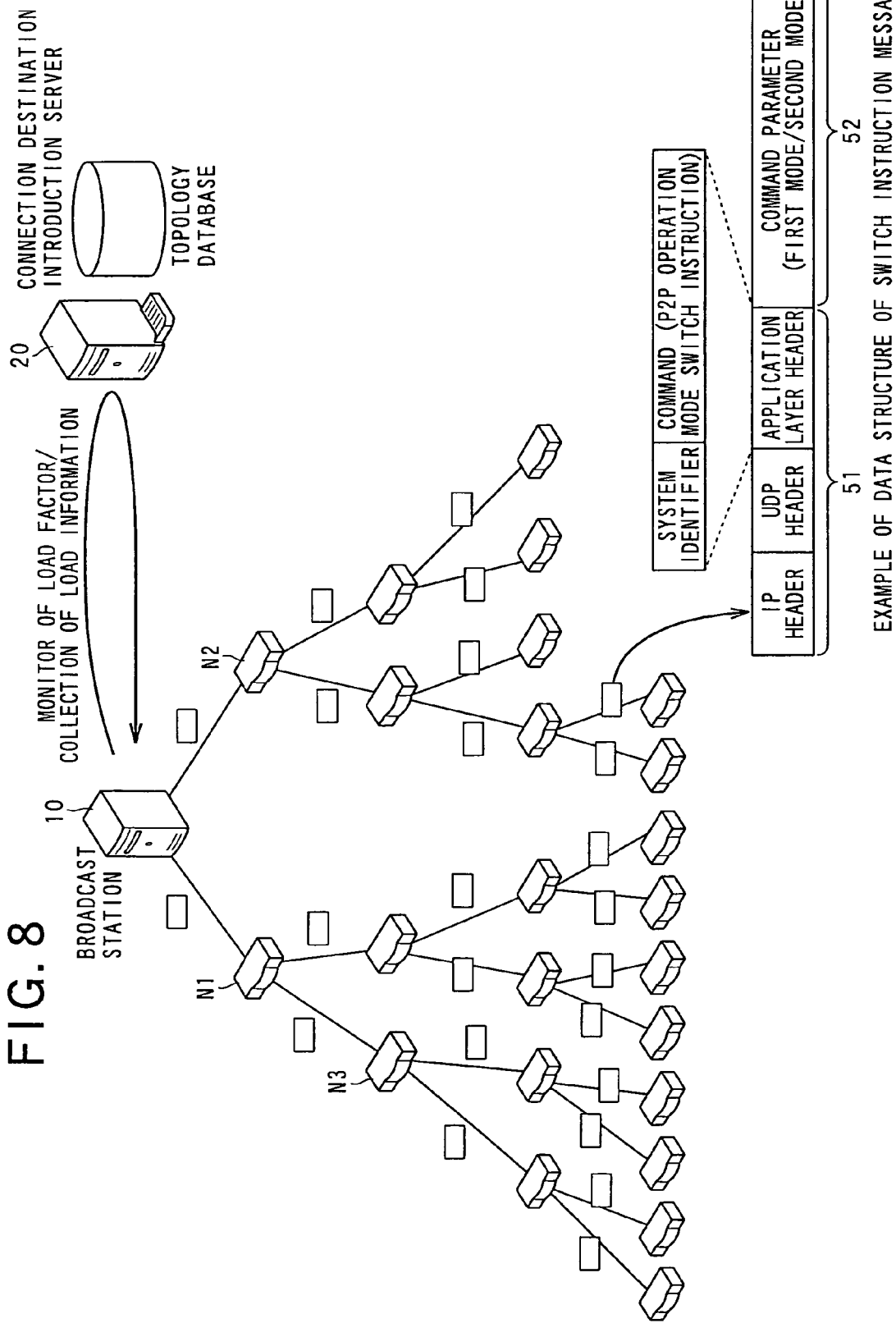
FIG. 8 is a view showing a status where an operation mode switch instruction message is broadcasted from the broadcast station 10 and a view showing an example of data structure of switch instruction message.

FIG. 8 is a view showing a status where an operation mode switch instruction message is broadcasted from the broadcast station 10 and a view showing an example of data structure of the switch instruction message.

As shown in FIG. 8, the switch instruction message is delivered to all nodes Nn participating in the tree topology. Further, the switch instruction message is configured by a header unit 51 including an IP header, a UDP (User Datagram Protocol) header, and an application layer header and a payload unit 52. A command of an operation mode switch instruction is described in the application layer header in the header unit 51. Either the first mode or the second mode is described as a command parameter in the payload unit 52.

[1-4. Configuration and the like of Connection Destination Introduction Server 20]

Figure 9:
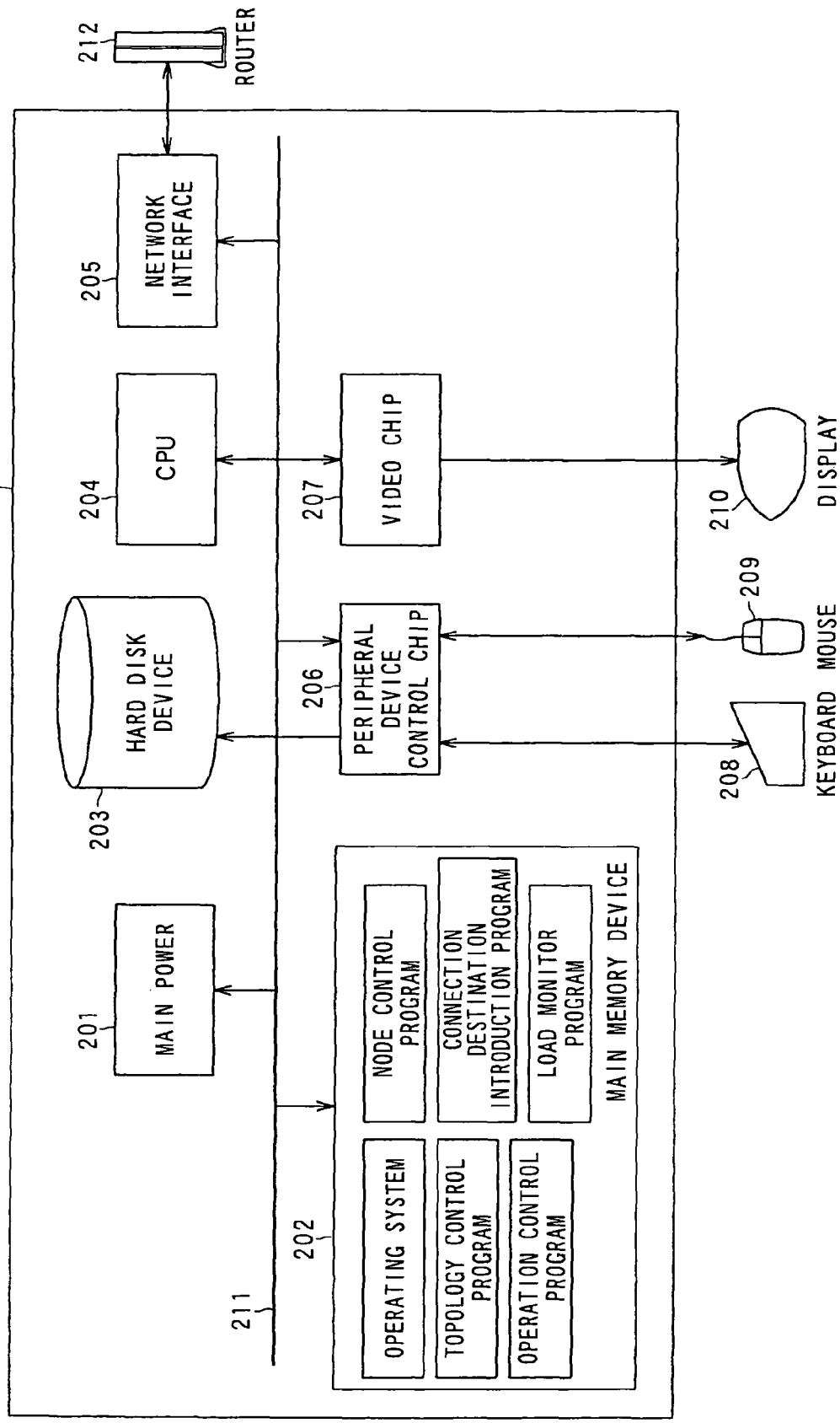
FIG. 9 is a view showing an example of schematic configuration of a connection destination introduction server 20.

Next, with reference to FIG. 9, a configuration and a function of the connection destination introduction server 20 are explained.

FIG. 9 is a view showing an example of schematic configuration of the connection destination introduction server 20.

As shown in FIG. 9, the connection destination introduction server 20 is configured by including a main power 201, a main memory device 202, a hard disk device 203, CPU 204, a network interface 205, a peripheral device control chip 206, a video chip 207, and the like. Further, the connection destination introduction server 20 is connected to a network 8 through a router 212.

Further, the main power 201, the main memory device 202, the hard disk device 203, the CPU 204, the network interface 205, the peripheral device control chip 206, the video chip 207 are mutually connected through a system bus 211. Further, a keyboard 208 and a mouse 209 are connected to the periphery device control chip 206, and a display 210 is connected to the video chip 207.

The main memory device 202 is configured by including RAN, ROM and the like, and memorizes an operating system, a node control program, a topology control program, a connection destination candidate introduction program, an operation control program, a load monitor program and the like.

Further, the hard disk device 203 is provided with a broadcast station management database and a topology database. Location information of respective broadcast stations 10 (e.g. IP address and port number) is registered in the broadcast station management database in correspondence with broadcast channel information (e.g. channel number). Topology management information is registered in the topology database. The topology management information exists every broadcast channel, and is in correspondence with broadcast channel information. The topology management information includes node information (e.g. IP address and port number) of respective nodes Nn participating in the tree topology, a hierarchy level where respective nodes Nn are located in the tree topology, downstream node information indicating nodes respectively connected downstream of respective nodes Nn, a connection allowable number of nodes connectable to downstream of respective nodes Nn, and transfer capacity of respective nodes Nn transferring content data to the other nodes Nn. Here, the transfer capacity refers to, for example, a CPU processing speed (GHz) of the node Nn and an effective bandwidth (e.g. data transfer speed (bps)) in the network 8.

According to various programs memorized in the main memory device 202, the CPU 204 searches a connection destination candidate (node Nn connectable to downstream side) where the number of nodes connected to downstream side does not meet the connection allowable number from the above topology management information according to a connection destination candidate introduction request message from, for example, the node Nn. Then the CPU 204 carries out a return process of returning a connection destination candidate response message including the location information of one or more connection destination candidates thus searched.

Further, the CPU 204 carries out an information process of regularly informing to the broadcast station 10 information including a usage rate of the own, an increase tendency of node connection frequency per unit time, a packet reception rate of the router device connected by the connection destination introduction server 20, a start time of popular broadcast service.

[1-5. Configuration and the like of Node Nn]

Figure 10:
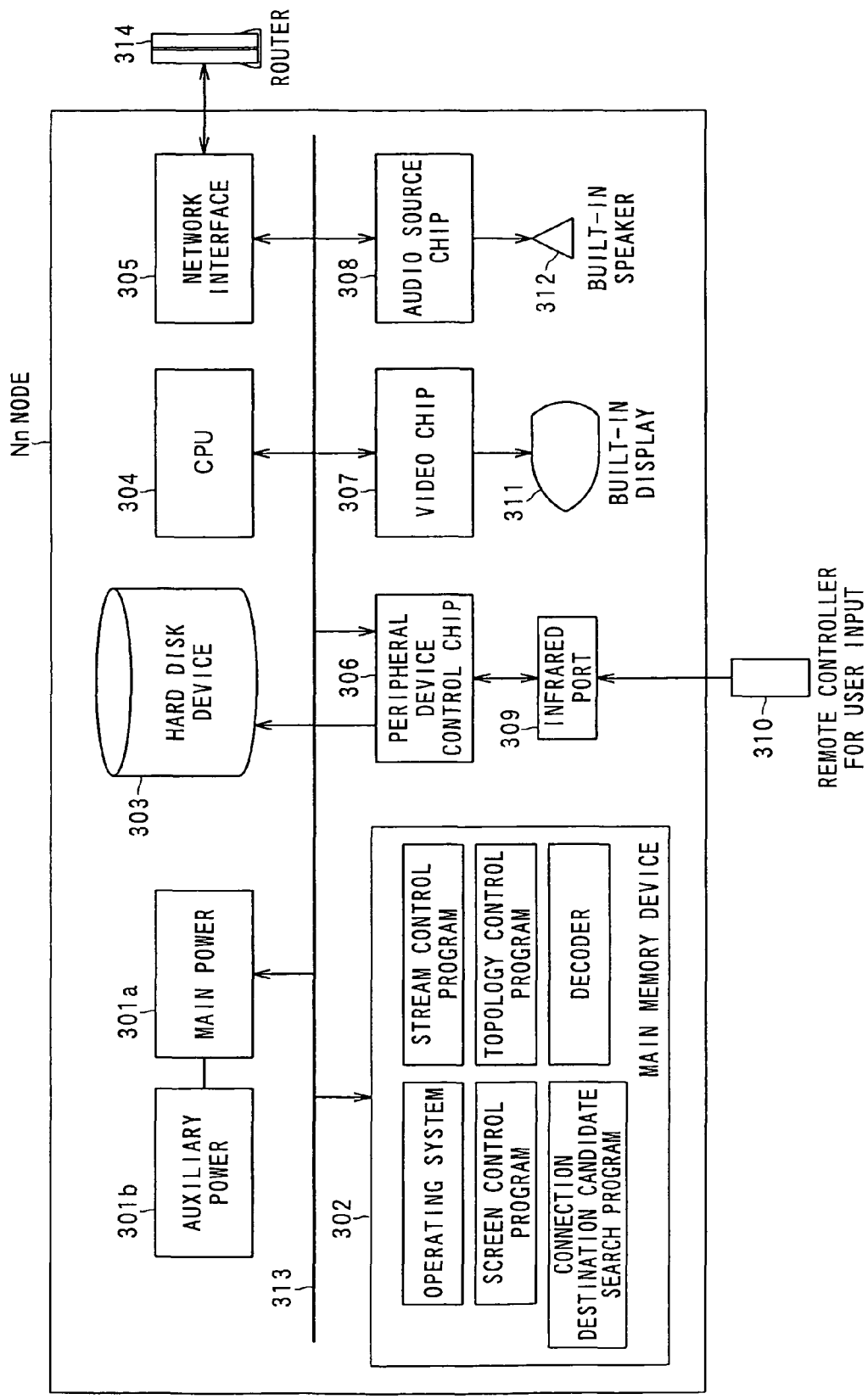
FIG. 10 is a view showing an example of schematic configuration of a node Nn.

Next, with reference to FIG. 10, a configuration and a function of a node Nn are explained.

FIG. 10 is a view showing an example of schematic configuration of the node Nn.

As shown in FIG. 10, a node Nn includes a main power 301a, an auxiliary power 301b, a main memory device 302, a hard disk device 303, CPU 304, a network interface 305, a peripheral device control chip 306, a video chip 307, an audio source chip 308, an infrared port 309 for infrared-communication with a remote controller 310 for user input, a built-in display 311, a built-in speaker 312, and the like. Further, the node Nn is connected to a network 8 through a router 314. Here, PC, STB (Set Top Box), a TV receiver or the like are applicable as the node Nn.

Further, the main power 301a, the main memory device 302, the hard disk device 303, the CPU 304, the network interface 305, the peripheral device control chip 306, the video chip 307, and the audio source chip 308 are mutually connected through a system bus 313.

The main memory device 302 includes RAM, ROM, and the like, and memorizes an operating system, a stream control program, a screen control program, a topology control program, a connection destination candidate search program, a decoder, and the like.

Further, location information (IP address, port number and the like) of the connection destination introduction server 20 is memorized in the main memory device 302. The node management table is also memorized in the main memory device 302, and node information (IP address, port number and the like) of the node Nn connected to downstream of the own node is registered in the node management table.

Further, the main memory device 302 has a buffer memory (e.g. ring buffer) for temporarily accumulating the received content data. Further, the main memory device 302 is provided with a cash region for previously memorizing (cashing) a list of location information of the search origin nodes to be a sending destination of the connection destination candidate search request message for searching a node Nn to be the above-described reconnection destination candidate.

The CPU 304 carries out a new participation process of participating in the tree-type broadcast system S according to various programs (including the node process program of the present invention) memorized in the main memory device 302. After the participation, a reproduction process is carried out while buffering a packet (content stream) of the content data which is delivered from the broadcast station 10 or the upper stream node Nn and received through the network interface 305.

Here, in the above new participation process, the connection destination candidate introduction request message is sent to the connection destination introduction server 20, and stream start is requested by connecting (session-establishing) to the upstream node Nn thus introduced from the connection destination introduction server 20.

Further, in the above reproduction process, content data (e.g. video data and audio data) accumulated in the received buffer memory are read out and decoded by the decoder. Thus decoded video data (image information) are outputted on the built-in display 311 (or an exterior display not shown) through the video chip 307. Thus decoded audio data (sound information) are outputted from the built-in speaker 312 (or an exterior speaker not shown) through the audio source chip 308.

Further, in a case where the downstream node Nn is connected to the own node, the CPU 304 carries out a transfer process of transferring respective packets of the content data accumulated in the buffer memory (relaying content stream) to the downstream node Nn.

Further, after the participation in the tree-type broadcast system S, the CPU 304 memorizes the location information of the search origin node included in an advertisement message received through the network interface 305 delivered from the broadcast station 10 or the upstream node Nn in the cash region in the main memory device 302. In a case where the downstream node Nn is connected to the own node, a transfer process of transferring the advertisement message to the downstream node Nn is carried out.

Further, the CPU 304 executes the above program to function as a mode selection means, a reconnection processing means, a search information sending means, a node information sending means, and the like of the present invention.

After the participation in the tree-type broadcast system S, the CPU 304 as a mode selection means carries out a selection process of selecting either of the above-mentioned first mode (the control mode based on hybrid P2P) and the above-mentioned second mode (the control mode based on pure P2P) according to a command parameter in, for example, the payload unit 52 of the switch instruction message delivered from the broadcast station 10 or the upstream node Nn and received through the network interface 305. That means the respective nodes Nn operate while alternatively switching the control methods related to the reconnection process in the own node between the first mode and the second mode when a switch instruction message of the operation mode broadcasted from the broadcast station 20 is received.

Then, in a case where the CPU 304 as a reconnection processing means cuts off connection to the upstream node Nn currently connected to the own and reconnects to another node Nn, the CPU 304 acquires the node information of the reconnection destination candidate (receiving the connection destination candidate response message from the connection destination introduction server 20 or the node Nn to be a connection destination candidate) as described above, according to the operation mode (the first mode or the second mode) currently selected, thereby determining the reconnection destination and carrying out a reconnection process.

For example, in a case where the second mode is selected at the time of reconnection, the CPU 304 selects location information of any search origin node (node information) from a list of location information of search origin node memorized in a cash region in the main memory device 302. According to the node information, the CPU 304 carries out a sending process of sending a connection destination candidate search request message to the search origin node. The search origin node receiving the connection destination candidate search request message thus sent and node Nn in a predetermined range existing downstream with the search origin node as an origin with reference to restriction described in a payload unit of the message. In a case where the own node can be a potential connection destination candidate, for example if the node Nn is connectable to downstream of the own node, the own node is regarded as the node Nn to be a reconnection destination candidate, and a connection destination candidate response message including node information of the own node is sent to a node Nn which is a source of sending the above connection destination candidate search request message.

[2. Operation of Tree-Type Broadcast System S]

Next, an operation of a tree-type broadcast system S according to the present embodiment is explained.

(Process of Node Nn)

First, with reference to FIGS. 11 to 15, a process of CPU 304 in a node Nn is explained.

FIGS. 11 to 15 are flowcharts showing a process carried out by the CPU 304.

Figure 11:
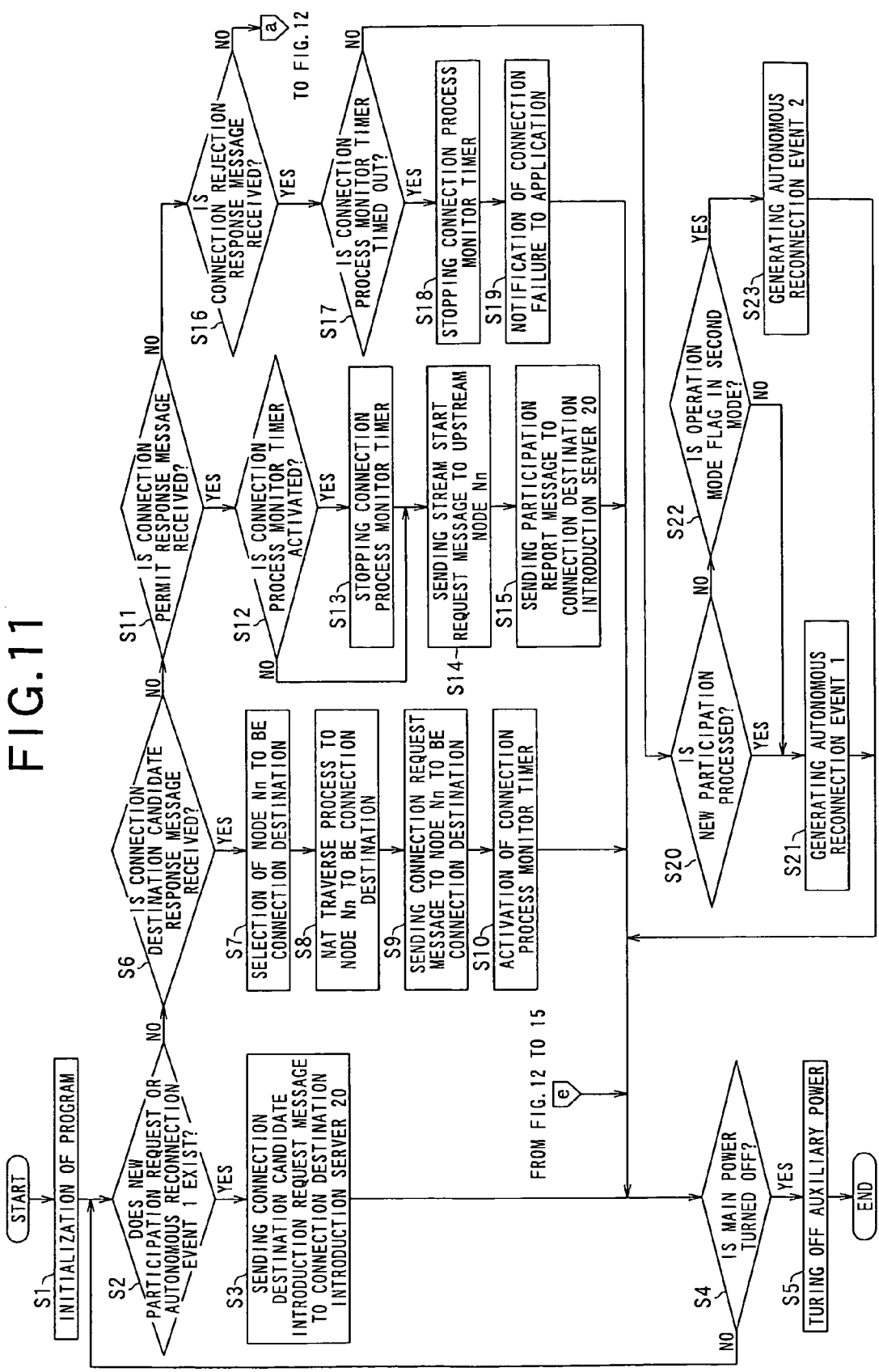
FIG. 11 is a flowchart of a process carried out by CPU 304 in the node Nn.
Figure 12:
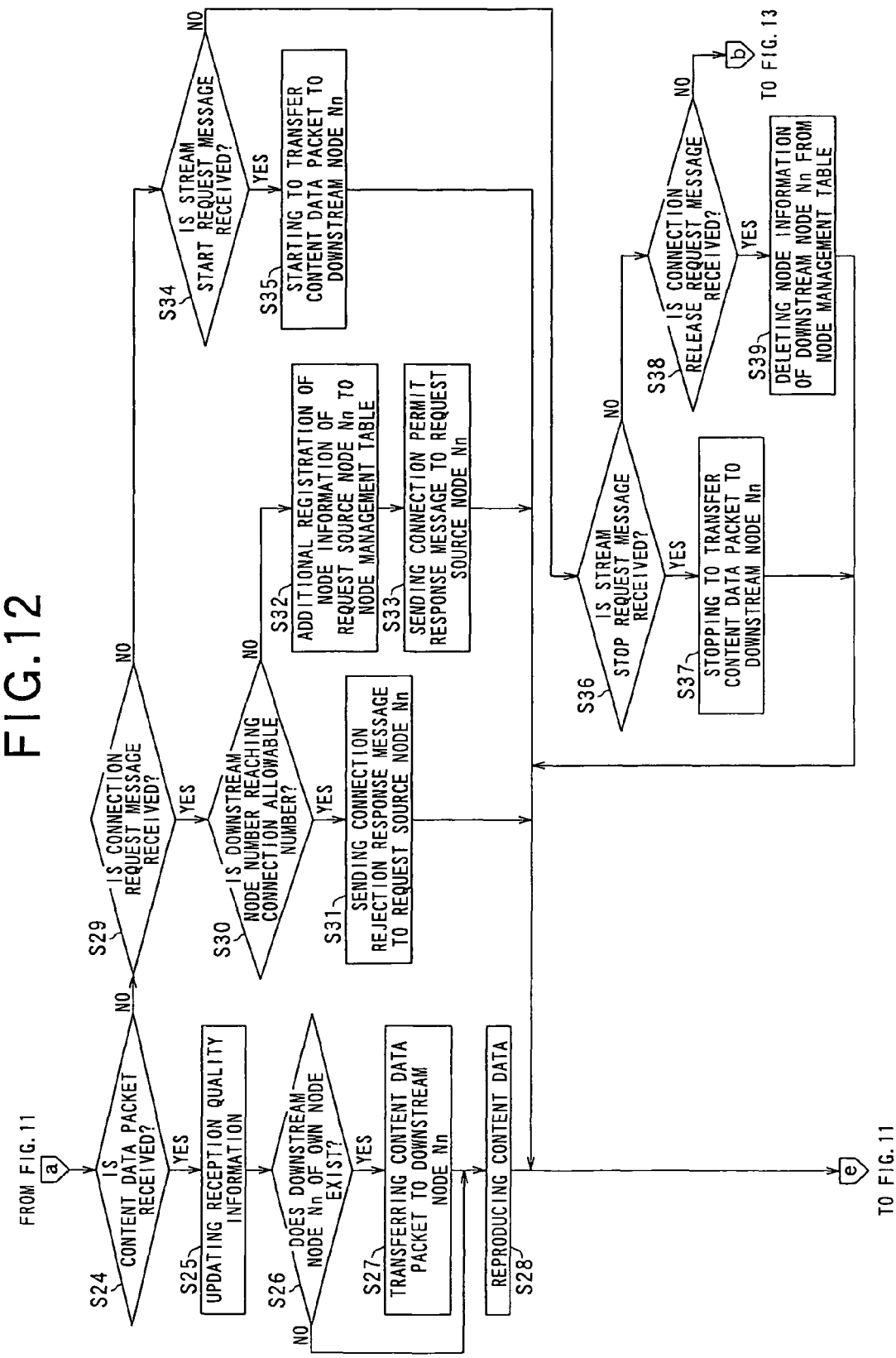
FIG. 12 is a flowchart of a process carried out by the CPU 304 in the node Nn.
Figure 13:
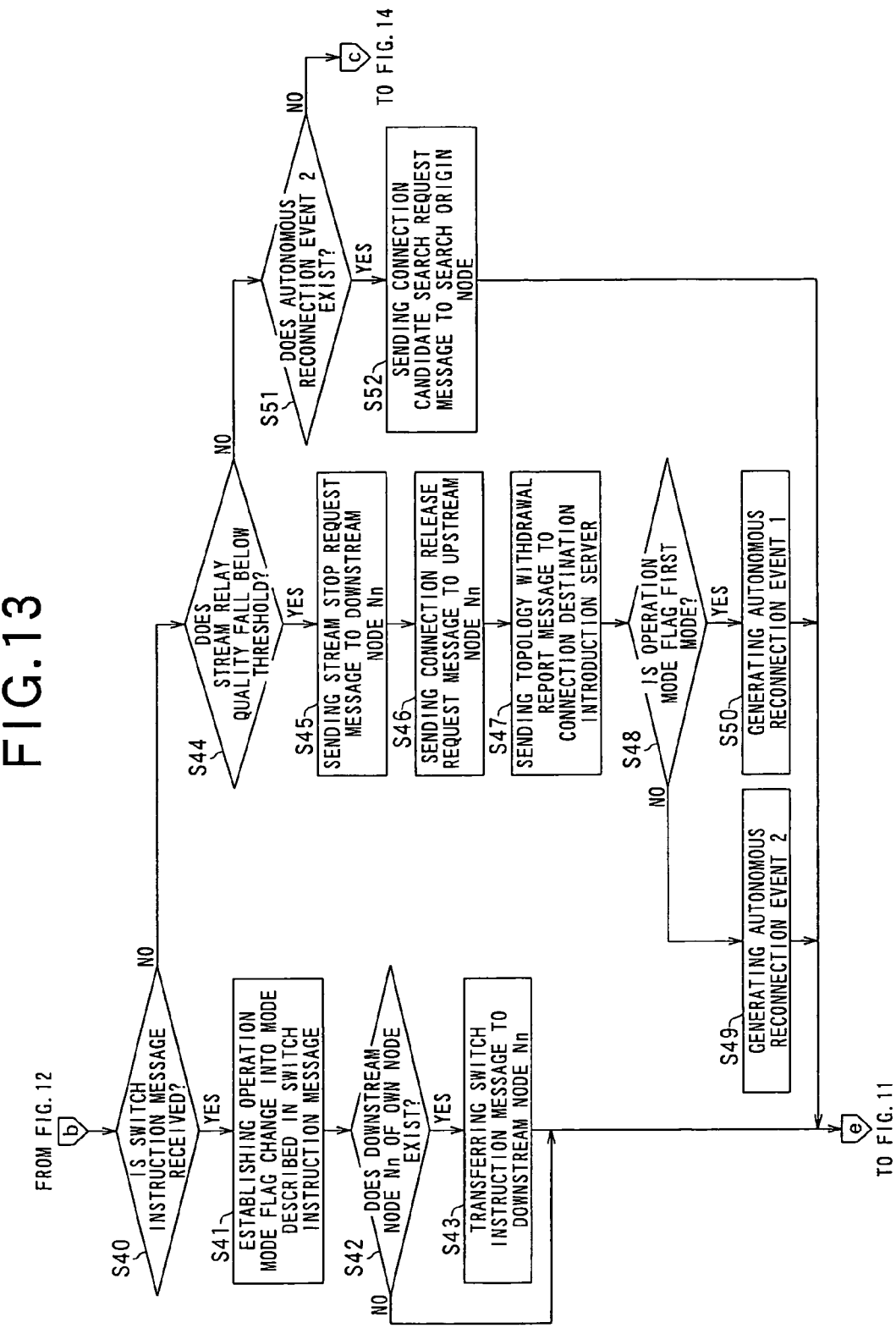
FIG. 13 is a flowchart of a process carried out by the CPU 304 in the node Nn.
Figure 14:
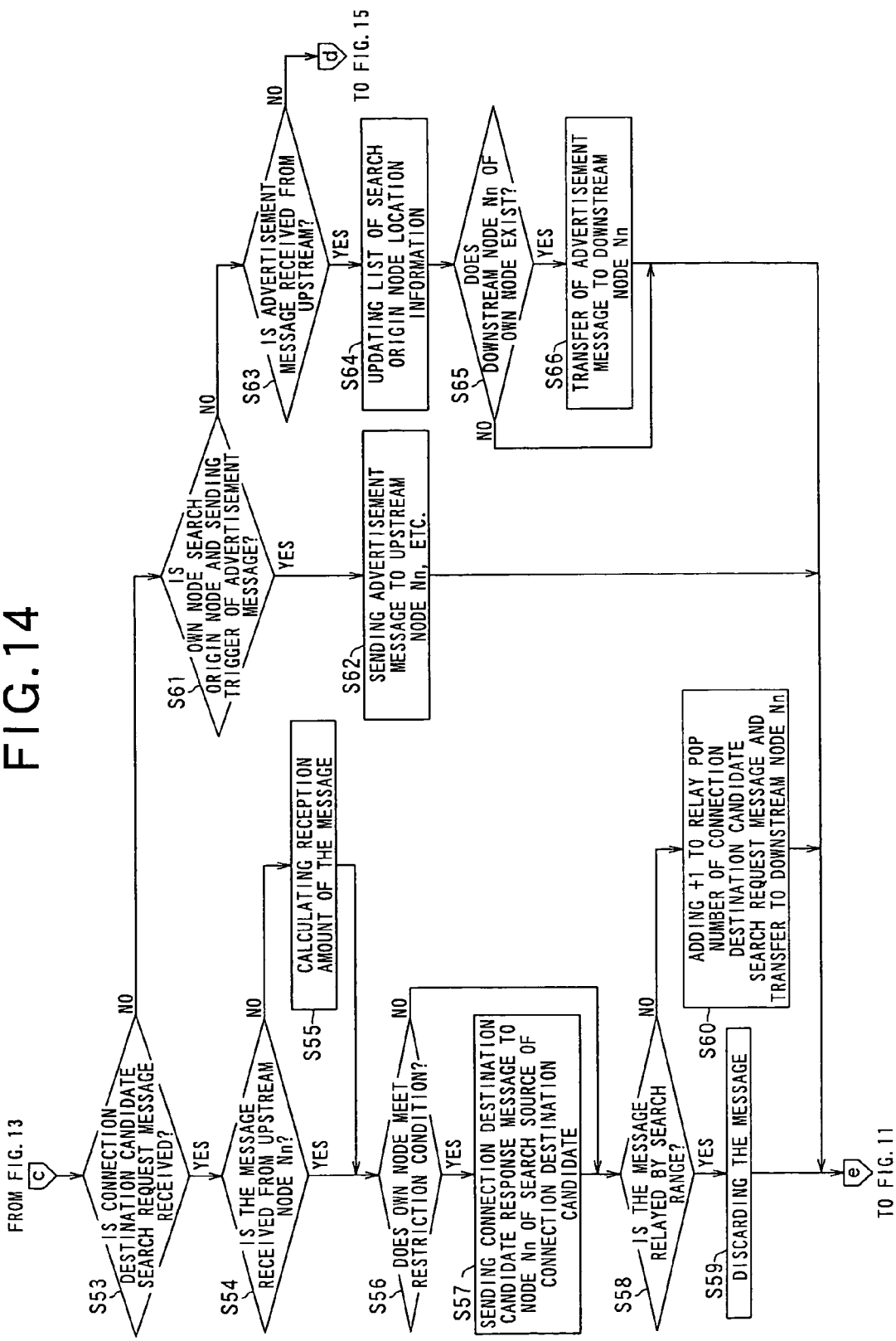
FIG. 14 is a flowchart of a process carried out by the CPU 304 in the node Nn.
Figure 15:
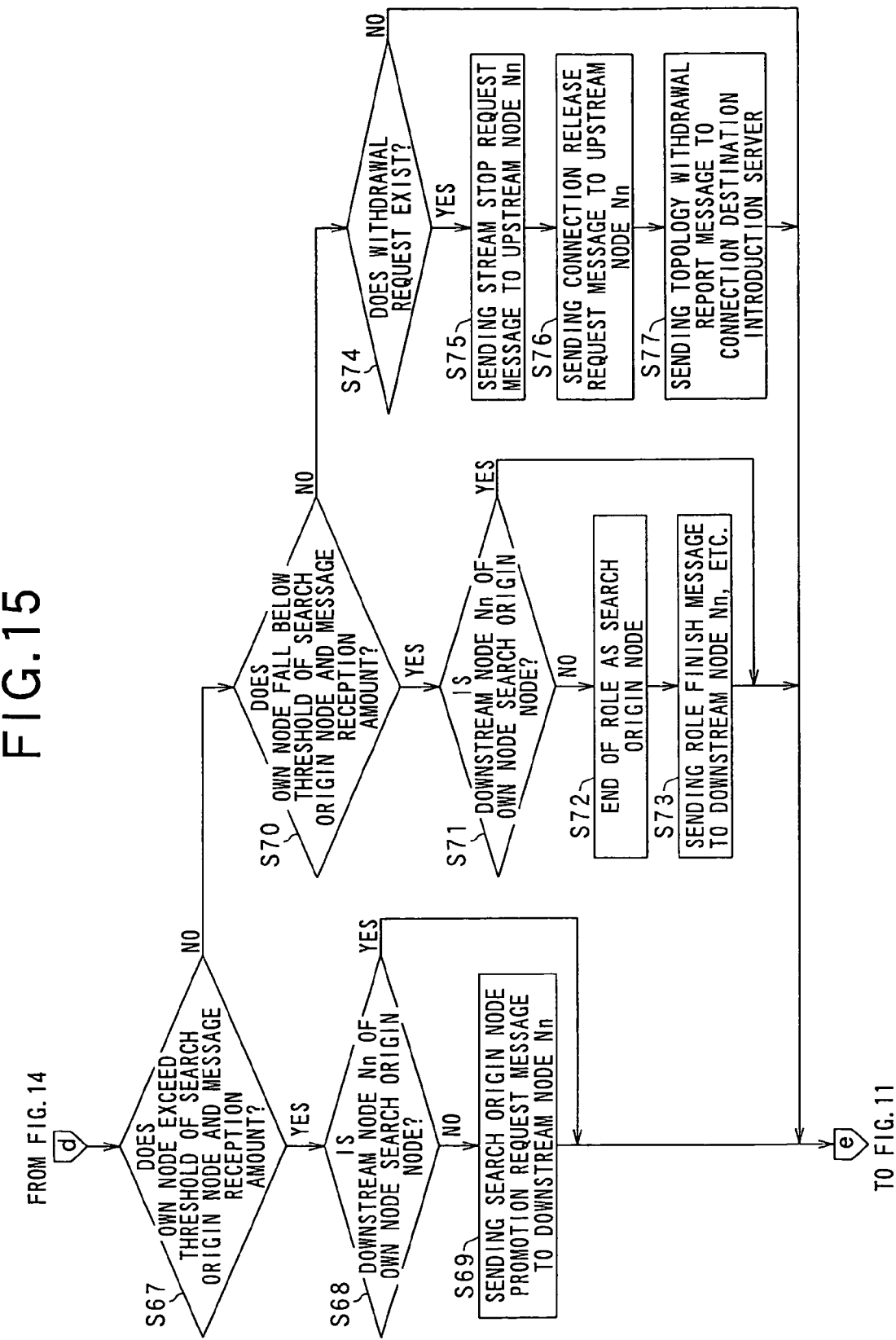
FIG. 15 is a flowchart of a process carried out by the CPU 304 in the node Nn.

A process of FIG. 11 starts by turning on, for example, a main power 301a and an auxiliary power 301b to activate a node Nn. When the process starts, various programs in the node Nn are initialized, and the above first mode is set up with respect to an operation mode flag in Step S1.

In Step S2, it is judged whether or not a new participation request is made from the user through a user input remote controller 310, or whether or not an autonomous reconnection event 1 (reconnection event in the first mode) occurs (being generated).

Then in a case where the new participation request is made by the user, or the autonomous reconnection event 1 occurs (Step S2: YES), the process goes to Step S3. In a case where the new participation request is not made by the user or the autonomous reconnection event 1 does not occur (Step S2: NO), the process goes to Step S6.

In Step S3, the connection destination candidate introduction request message is sent to the connection destination introduction server 20 according to the location information of the connection destination introduction server 20.

In Step S4, it is judged whether or not the main power 301a of the node Nn is turned off. In a case where the main power 301a is turned off (Step S4: YES), the process goes to Step S5. In a case where the main power 301a is not turned off (Step S4: NO), the process returns to Step S2.

In Step S5, various programs are terminated when the main power 301a is turned off, and the auxiliary power 301b is turned off. The process is finished.

In Step S6, it is judged whether or not the connection destination candidate response message is received from the connection destination introduction server 20 or the node Nn to be a reconnection destination candidate. In a case where the connection destination candidate response message is received (Step S6: YES), the process goes to Step S7. In a case where the connection destination candidate response message is not received (Step S6: NO), the process goes to Step S11.

In Step S7, a single node Nn4 which meets requirement (or at random) is selected (determined) as a connection destination (or reconnection destination) among a single or plural connection destination (upstream node) candidates which are acquired upon receipt of the connection destination candidate response message.

In Step S8, an NAT traversal process (a process of passing a packet from a network on a WAN side of the router to a network on a LAN side) is carried out to a node Nn to be the connection destination thus selected.

In Step S9, the connection request message is sent to a node Nn to be the connection destination thus selected.

In Step S10, a connection process monitor timer is activated for monitoring the connection process, and the process returns to Step S4.

In Step S11, it is judged whether or not a connection permit response message is received from the upstream node Nn receiving the above connection request message. In a case where the connection permit response message is received (Step S11: YES), the process goes to Step S12. In a case where the connection permit response message is not received (Step S11: NO), the process goes to Step S16.

In Step S12, it is judged whether or not the above connection process monitor timer is activated. In a case where the connection process monitor timer is activated (Step S12: YES), the timer stops (Step S13), and the process goes to Step S14. In a case where the connection process monitor timer is not activated (Step S12: NO), the process goes to Step S14.

In Step S14, a stream start request message is sent to the upstream node Nn sending the above connection permit response message.

In Step S15, a report message of participating in the tree topology of the own node is sent to the connection destination introduction server 20, and the process returns to Step S4.

In Step S16, it is judged whether or not a connection rejection response message is received from the upstream node Nn receiving the above connection request message. In a case where the connection rejection response message is received (Step S16: YES), the process goes to Step S17. In a case where the connection rejection response message is not received (Step S16: NO), the process goes to Step S24.

In Step S17, it is judged whether or not the connection process monitor timer is time out. In a case where the connection process monitor timer is time out (connection process time running out) (Step S17: YES), the process goes to Step S18. In a case where the connection process monitor timer is not time out (retrial of the connection process is possible) (Step S17: NO), the process goes to Step S20.

In Step S18, the connection process monitor timer is stopped. In Step S19, a connection failure is notified to an application, and the process returns to Step S4.

In Step S20, it is judged whether or not the new participation procedure is in the process. In a case where the new participation procedure is proceeding (Step S20: YES), the process goes to Step S21. In a case where the new participation procedure is not proceeding (Step S20: NO), the process goes to Step S22.

In Step S21, the autonomous reconnection event 1 (reconnection event in the first mode) is generated, and the process returns to Step S4.

In Step S22, it is judged whether or not the second mode is set (selected) to the operation mode flag. In a case where the second mode is not set to the operation mode flag (Step S22: NO), the process goes to Step S21, and the autonomous reconnection event 1 (reconnection event in the first mode) is generated. In a case where the second mode is set (Step S22: YES), the process goes to Step S23, the autonomous reconnection event 2 (reconnection event in the second mode) is generated, and the process returns to Step S4.

In Step S24, it is judged whether or not the content data packet is received from the broadcast station 10 or the upstream node Nn.

Then, in a case where the content data packet is received (Step S24: YES), the process goes to Step S25. In a case where the content data packet is not received (Step S24: NO), the process goes to Step S29.

In Step S25, reception quality information managed in, for example, the main memory device 302 is updated. For example, the CPU 304 calculates an average packet rate for the past year, an average packet loss rate, a packet arrival variation, and the like, and updates reception quality information calculated and memorized in the past.

In Step S26, it is judged whether or not a downstream node Nn of the own node exists (a node Nn is directly connected on the downstream side). In a case where the downstream node Nn of the own node exists (Step S26: YES), the above received content data packet is transferred (relayed) to the downstream node Nn (Step S27), and the process goes to Step S28. In a case where the downstream node Nn of the own node does not exist (Step S26: NO), the process goes to Step S28.

In Step S28, the content data is reproduced. That means the content data accumulated in the received buffer memory are read out, and reproduced and outputted through the built-in display 311, the built-in speaker 312, and the like.

In Step S29, it is judged whether or not the connection request message is received from the other node Nn. In a case where the connection request message is received (Step S29: YES), the process goes to Step S30. In a case where the connection request message is not received (Step S29: NO), the process goes to Step S34.

In Step S30, it is judged whether or not a number of the downstream nodes Nn connected to the own node reaches the connection allowable number (upper limit) of the own node. In a case where the number of the downstream nodes Nn reaches the connection allowable number of the own node (Step S30: YES), the process goes to Step S31. In a case where the number of the downstream nodes Nn does not reach the connection allowable number of the own node (Step S30: NO), the process goes to Step S32.

In Step S31, a connection rejection response message is sent to the node Nn sending the connection request message, and the process returns to Step S4.

In Step S32, node information of the node Nn sending the above connection request message is additionally registered in the node management table as downstream node information.

In Step S33, a connection permit response message is sent to the node Nn sending the above connection request message, and the process returns to Step S4. In this way, the node Nn sending the above connection request message becomes a new downstream node Nn connected to the own node.

In Step S34, it is judged whether or not a stream start request message is received from the downstream node Nn. In a case where the stream start request message is received (Step S34: YES), the process goes to Step S35. In a case where the stream start request message is not received (Step S34: NO), the process goes to Step S36.

In Step S35, transfer (relay) of the content data packet to the downstream node Nn sending the stream start request message starts (starting stream), and the process returns to Step S4.

In Step S36, it is judged whether or not a stream stop request message is received from the downstream node Nn. In a case where the stream stop request message is received (Step S36: YES), the process goes to Step S37. In a case where the stream stop request message is not received (Step S36: NO), the process goes to Step S38.

In Step S37, transfer of the content data packet to the downstream node Nn stops (stop streaming), and the process returns to Step S4.

In Step S38, it is judged whether or not a connection release request message is received from the downstream node Nn. In a case where the connection release request message is received (Step S38: YES), the process goes to Step S39. In a case where the connection release request message is not received (Step S38: NO), the process goes to Step S40.

In Step S39, node information of the downstream node Nn sending the connection release request message is deleted from the node management table, and the process returns to Step S4.

In Step S40, it is judged whether or not an operation mode switch instruction message is received from the broadcast station 10 or the upstream node Nn. In a case where the switch instruction message is received (Step S40: YES), the process goes to Step S41. In a case where the switch instruction message is not received (Step S40: NO), the process goes to Step S44.

In Step S41, the operation mode flag is changed to the mode described in the switch instruction message, and set up.

In Step S42, it is judged whether or not the downstream node Nn of the own node exists. In a case where the downstream node Nn of the own node exists (Step S42: YES), the switch instruction message thus received is transferred (relayed) to the downstream node Nn (Step S43), and the process returns to Step S4. In a case where the downstream node Nn of the own node does not exist (Step S42: NO), the process returns to Step S4.

In Step S44, it is judged whether or not, for example, a stream relay quality (reception quality) falls below the threshold level based on the above-described reception quality information. In a case where it is detected that the stream relay quality falls below the threshold level (Step S44: YES), the process goes to Step S45. In a case where the stream relay quality does not fall below the threshold level (Step S44: NO), the process goes to Step S51.

In Step S45, the stream stop request message is sent to the upstream node Nn. Next in Step S46, the connection release request message is sent to the upstream node Nn.

In Step S47, a report message of withdrawing from the own node topology is sent to the connection introduction server 20.

In Step S48, it is judged whether or not the first mode is set to the operation mode flag. In a case where the first mode is not set to the operation mode flag (Step S48: NO), the process goes to Step S49, and the autonomous reconnection event 2 (reconnection event in the second mode) is generated. In a case where the first mode is set up (Step S48: YES), the process goes to Step S50, and the autonomous reconnection event 1 (reconnection event in the first mode) is generated. The process returns to Step S4.

In Step S51, it is judged whether or not the autonomous reconnection event 2 (reconnection event in the second mode) occurs (being generated). In a case where the autonomous reconnection event 2 occurs (Step S51: YES), the process goes to Step S52. In a case where the autonomous reconnection event 2 does not occur (Step S51: NO), the process goes to Step S53.

In Step S52, any search origin node is selected (e.g. at random) from the list of location information of search origin nodes memorized in a cash region of the main memory device 302, and the connection destination candidate search request message is sent to the search origin node thus selected. The process returns to Step S4. Here, it is suspended for a predetermined period after the connection destination candidate search request message is sent, because there is a possibility that the connection destination candidate response message is received from plural other nodes Nn. In a case where the connection destination candidate response message is received from plural other nodes Nn (Step S6), a single node Nn is selected among them (Step S7), and the connection request message is sent to the node Nn. Here, in a case where the connection rejection response message is received from this node Nn and when the connection process monitor timer is not time out (retrial is possible), the autonomous reconnection event 2 is generated.

In Step S53, it is judged whether or not a connection destination candidate search request message is received from the other node Nn. In a case where the connection destination candidate search request message is received (Step S53: YES), the process goes to Step S54. In a case where the connection destination candidate search request message is not received (Step S53: NO), the process goes to Step S61.

In Step S54, it is judged whether or not the above connection destination candidate search request message is received from the upstream node Nn. The connection destination candidate search request message can be received in a case where the own node is a search origin node or otherwise. The former case is that the connection destination candidate search request message is directly received from the node Nn being a search source of the connection destination candidate in the second mode. The latter case is that the connection destination candidate search request message is relayed and received from the upstream node Nn in the second mode.

In a case where the above connection destination candidate search request message is not received from the upstream node Nn, in other word, received from the connection destination candidate search source node Nn (Step S54: NO), a message reception amount per unit time is calculated as a previous process (Step S55), and temporarily memorized. The process goes to Step S56. In a case where the above connection destination candidate search request message is received from the upstream node Nn (Step S54: YES), the process goes to Step S56 without calculation.

In Step S56, it is judged whether or not the own node is a node which meets the restriction described in the connection destination candidate search request message (e.g. there is a vacancy where the node Nn is connectable to downstream of the own node). In a case where the own node is a node which meets the above restriction (Step S56: YES), the connection destination candidate response message is sent to the connection destination candidate search source node Nn (Step S57), and the process goes to Step S58. In a case where the own node is not a node which meets the above restriction (Step S56: NO), the connection destination candidate response message is not sent to the connection destination candidate search source node Nn, and the process goes to Step S58.

In Step S58, it is judged whether or not the connection destination candidate search request message is relayed by a portion of search range which is described in this message. For example, a header unit of the connection destination candidate search request message is referred to, and it is examined whether or not this message is already relayed by a portion of search range defined in the message (e.g. it is found from the header unit that "it is defined that the message should not be transferred more than 10 hops, and the message is currently transferred up to 8 hops").

In a case where it is relayed by a portion of search range which is described in the connection destination candidate search request message (e.g. being already transferred by 10 hops in the previous example) (Step S58: YES), the message is abandoned (Step S59), and the process returns to Step S4. In a case where it is not relayed by a portion of search range which is described in the connection destination candidate search request message (e.g. being transferred only by 8 hops in the previous example) (Step S58: NO), a number of relay pops of the connection destination candidate search request message is added +1, and transferred to the downstream node Nn (Step S60). The process goes to Step S4.

In Step S61, it is judged whether or not the own node is a search origin node and becomes a trigger of sending the advertisement message. In a case where the own node is the search origin node and becomes the trigger of sending the advertisement message (Step S61: YES), the process goes to Step S62. Otherwise (Step S61: NO), the process goes to Step S63.

In Step S62, the advertisement message is sent to the broadcast station 10 or the upstream node Nn. For example, the advertisement message is periodically sent (e.g. every one minute). In this way, in the upstream node Nn receiving the advertisement message, this message is sent to further upstream node Nn until the message reaches the broadcast station 10. (With respect to a relay process (a process when the advertisement message is received from the downstream node Nn) of the advertisement message, a figure is omitted.)

In Step S63, it is judged whether or not the advertisement message is received from the broadcast station 10 or the upstream node Nn (upstream). In a case where the advertisement message is received from the broadcast station 10 or the upstream node Nn (Step S63: YES), the process goes to Step S64. In a case where the advertisement message is not received (Step S63: NO), the process goes to Step S67.

In Step S64, the location information list of the search origin node memorized in the cash region of the main memory device 302 is updated (cash being updated) by the location information of the search origin node described in the advertisement message. In this update process, for example location information of new search origin node is added to the list after the cash is cleared, thereby leaving no location information of the old search origin node.

In Step S65, it is judged whether or not the downstream node Nn of the own node exists. In a case where the downstream node Nn of the own node exists (Step S65: YES), the above received advertisement message is transferred (re-layed) to the downstream node Nn (Step S66), and the process returns to Step S4. In a case where the downstream node Nn of the own node does not exist (Step S65: NO), the process returns to Step S4.

In Step S67, it is judged whether or not the own node is the search origin node and a reception amount (the reception amount calculated and memorized in Step S55) of the connection destination candidate search request message per unit time exceeds the threshold level. In a case where the own node is the search origin node and the reception amount of the connection destination candidate search request message exceeds the threshold level (Step S67: YES), the process goes to Step S68. Otherwise (Step S67: NO), the process goes to Step S70.

In Step S68, it is judged whether or not the downstream node Nn connected to the own node is the search origin node. In a case where the downstream node Nn is not the search origin node (Step S68: NO), a search origin node promotion request message is sent to the downstream node Nn (Step S69), and the process returns to Step S4. In a case where the downstream node Nn is the search origin node (Step S68: YES), the process returns to Step S4 without sending the search origin node promotion request message.

That means a total amount of the search origin node increases and decreases depending on a load status of respective search origin nodes. In a case where the reception amount of the connection destination candidate search request message per unit time in the search origin node does not exceed the threshold level, and the downstream node Nn connected to the node is not yet the search origin node, promotion to the search origin node is instructed to the downstream node Nn to increase the total amount of the search origin node.

In Step S70, it is judged whether or not the own node is the search origin node and a reception amount of the connection destination candidate search request message per unit time falls below the threshold level. In a case where the reception amount of the connection destination candidate search request message falls below the threshold level (Step S70: YES), the process goes to Step S71. Otherwise (Step S70: NO), the process goes to Step S74.

In Step S71, it is judged whether or not the downstream node Nn connected to the own node is the search origin node. In a case where the downstream node Nn is not the search origin node (Step S71: NO), a role as the search origin node is finished (Step S72), and a role finish message indicating finish of the role as the search origin node is sent to the broadcast station 10 or the upstream node Nn (Step S73). The process returns to Step S4. In a case where the downstream node Nn is the search origin node (Step S71: YES), the process returns to Step S4 without finishing the role as the search origin node.

That means in a case where a reception amount of the connection destination candidate search request message per unit time in the search origin node falls below the threshold level and the downstream node Nn connected to the node is not yet the search origin node, the node finishes the role as the search origin node, and notifies the effect to the upstream node Nn to decrease a total amount of the search origin node.

In Step S74, it is judged whether or not a withdrawal request is made from the user through the user input remote controller 310. In a case where the withdrawal request is made from the user (Step S74: YES), the process goes to Step S75. In a case where the withdrawal request is not made from the user (Step S74: NO), the process returns to Step S4.

In Step S75, a stream stop request message is sent to the upstream node Nn.

In Step S76, a connection release request message is sent to the upstream node Nn. In this way, the own node withdraws from the tree topology.

In Step S77, a report message of withdrawing from the own node topology is sent to the connection destination introduction server 20.

(Process of Broadcast Station 10)

Figure 16:
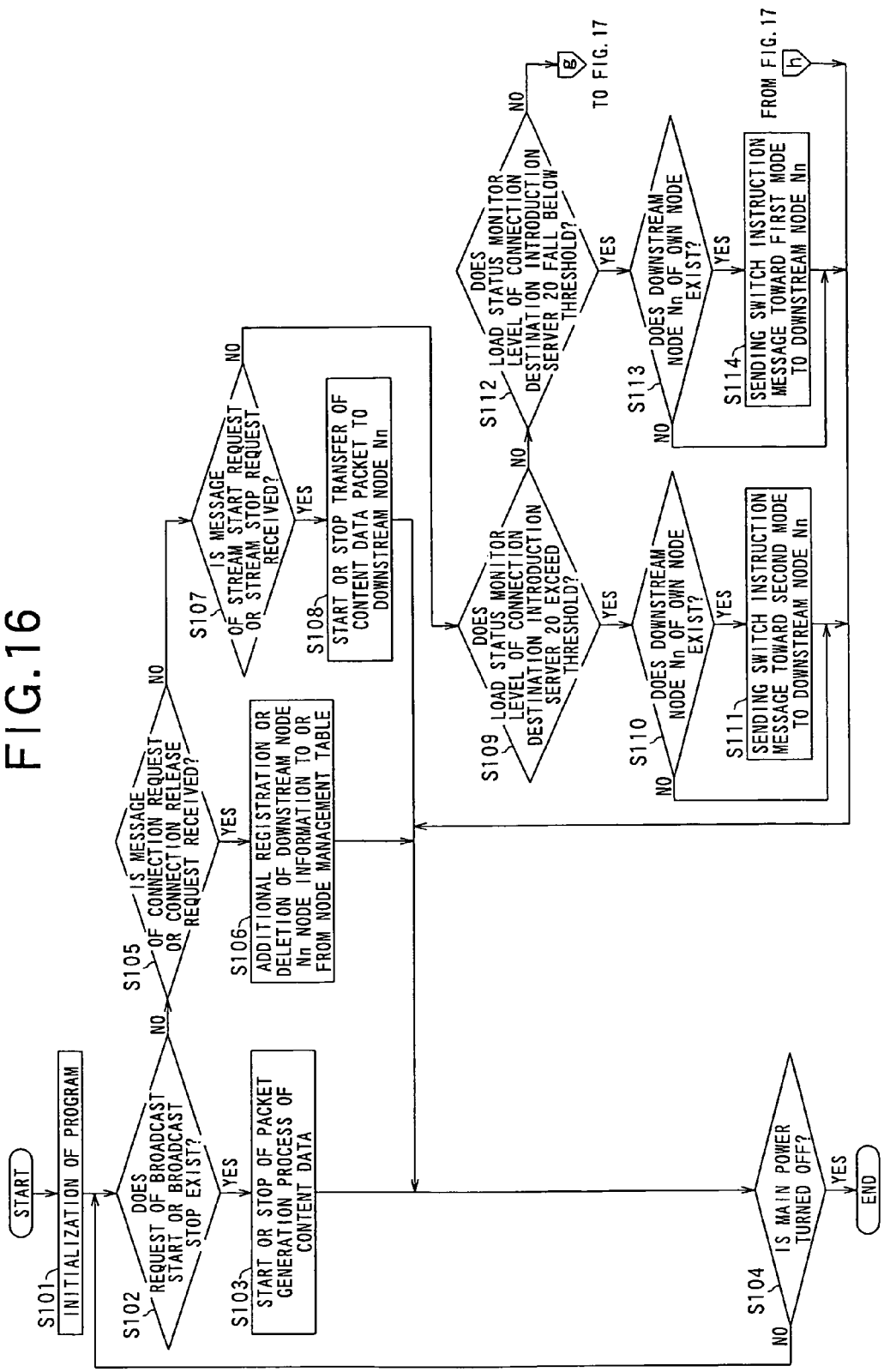
FIG. 16 is a flowchart of a process carried out by CPU 104 in the broadcast station 10.
Figure 17:
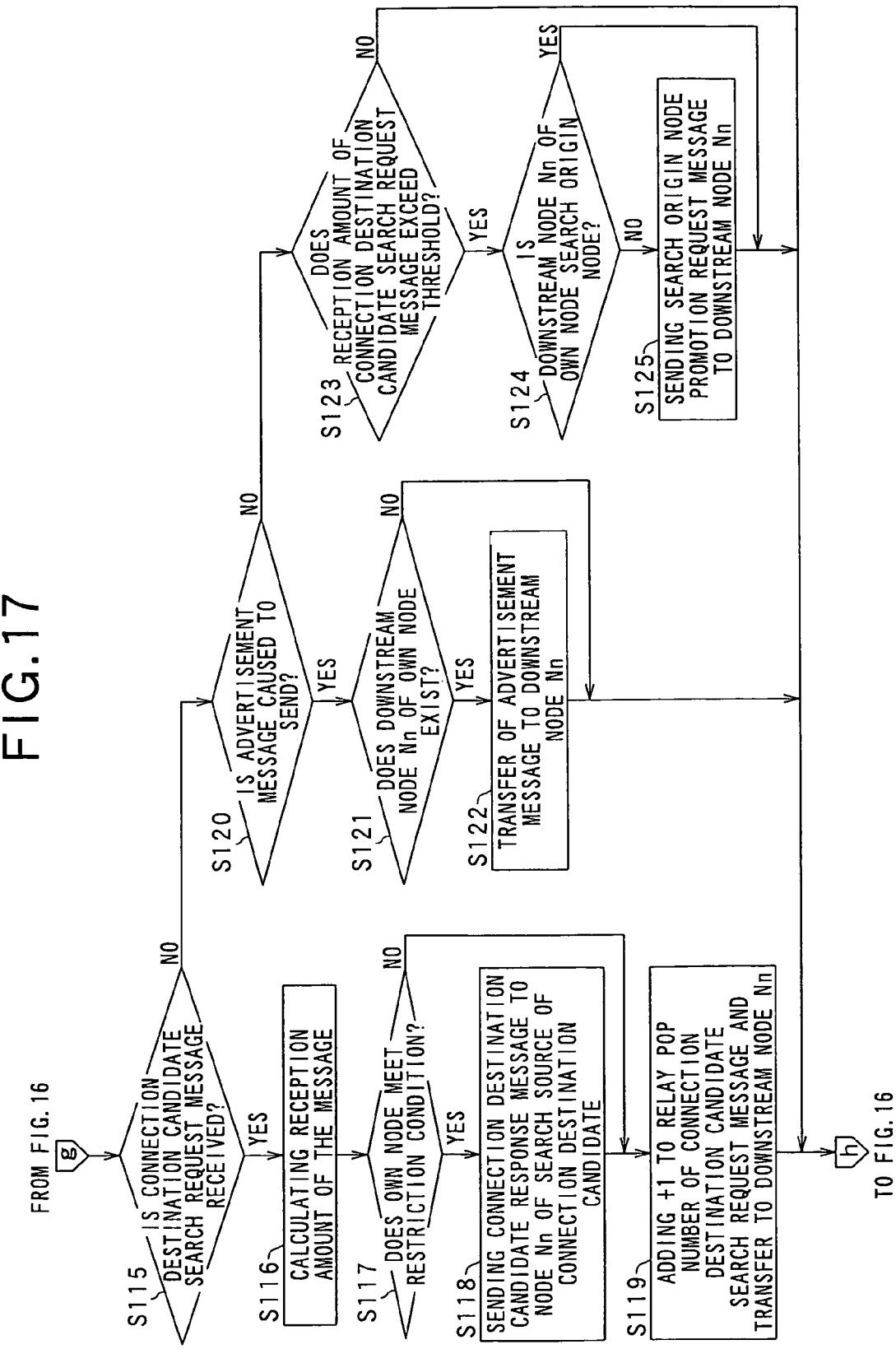
FIG. 17 is a flowchart of a process carried out by the CPU 104 in the broadcast station 10.

Next, with reference to FIGS. 16 and 17, a process of CPU 104 in the broadcast station 10 is explained.

FIGS. 16 and 17 are flowcharts showing a process carried out by the CPU 104 in the broadcast station 10.

A process of FIG. 16 starts by turning on a main power 101 to activate the broadcast station 10. When the process starts, various programs in the broadcast station 10 are initialized in Step S101.

In Step S102, it is judged whether or not a broadcast start or finish is requested by a broadcast operator. In a case where the broadcast start or finish is requested (Step S102: YES), the process goes to Step S103. In a case where the broadcast start or finish is not requested (Step S102: NO), the process goes to Step S105.

In Step S103, a generation process of content data packet is started or finished according to broadcast start or stop request. When the generation process of the content data packet starts, content data recorded in a hard disk device 103 is accessed to read out, the content data packet is generated in synchronization with a system timer, and the packet is stored in a buffer memory. On the other hand, when the generation process of content data packet stops, access to read out content data recorded in the hard disk device 103 is stopped, and the buffer memory is cleared.

In Step S104, it is judged whether or not the main power 101 of the broadcast station 10 is turned off. In a case where the main power 101 is turned off (Step S104: YES), various programs are terminated, and the process is finished. In a case where the main power 101 is not turned off (Step S104: NO), the process returns to Step S102.

In Step S105, it is judged whether or not a connection request message or a connection release request message is received from a node Nn connected to downstream of the broadcast station 10. In a case where the connection request message or the connection release request message is received (Step S105: YES), the process goes to Step S106. In a case where the connection request message or the connection release request message is not received (Step S105: NO), the process goes to Step S107.

In Step S106, node information of the downstream node Nn is additionally registered to or deleted from the node management table.

In Step S107, it is judged whether or not a stream start request message or a stream stop request message is received from the node Nn connected to downstream of the broadcast station 10. In a case where the stream start request message or the stream stop request message is received (Step S107: YES), the process goes to Step S108. In a case where the stream start request message or the stream stop request message is not received (Step S107: NO), the process goes to Step S109.

In Step S108, transfer of the content data packet to a downstream node Nn is started or stopped, and the process returns to Step S104.

In Step S109, it is judged whether or nor a monitor level of load status of the connection destination introduction server 20 exceeds a threshold level, based on information necessary for monitoring the load status which is acquired from the connection destination introduction server 20. Here, with respect to the status that the monitor level of the load status exceeds the threshold level, it includes the status that a measurement value as a monitor level exceeds an allowable level being a threshold level. In addition, it includes the status that there is notification of an excessive load status of the connection destination introduction server 20 and that there is no response from the connection destination introduction server 20.

Here, the information necessary for monitoring the load status includes a usage rate of the own, an increase tendency of node connection frequency per unit time, a packet reception rate of the router device connected by the connection destination introduction server 20, information indicating start time of popular broadcast service, and the like. In addition, it includes excessive load status notification information from the connection destination introduction server 20, the excessive load status recovery notification information, no-response (life-or-death response) information, no-response recovery notification information, and the like.

Then, in a case where the monitor level of the load status of the connection destination introduction server 20 exceeds the threshold level (Step S109: YES), the process goes to Step S110. In a case where the monitor level of the load status does not exceed the threshold level (Step S109: NO), the process goes to Step S112.

In Step S110, it is judged whether or not a downstream node Nn of the broadcast station 10 exists. In a case where the downstream node Nn of the broadcast station 10 exists (Step S110: YES), a switch instruction message for instructing to switch to a second mode is sent to the second mode (Step S111) and the process returns to Step S104. In a case where the downstream node Nn does not exist in the own node (Step S110: NO), the process returns to Step S104.

In Step S112, it is judged whether or not the monitor level of load status of the connection destination introduction server 20 falls below the threshold level for predetermined period, based on information necessary for monitoring the load status which is acquired from the connection destination introduction server 20. Here, with respect to the status that the monitor level of the load status falls below the threshold level, it includes the status that the measurement value as the monitor level falls below the allowable level being a threshold level. In addition, it includes the status that there is notification of recovery from the excessive load status of the connection destination introduction server 20 and that there is response recovery from the connection destination introduction server 20.

In a case where the monitor level of the load status of the connection destination introduction server 20 falls below the threshold level (Step S112: YES), the process goes to Step S113. In a case where the monitor level of the load status does not fall below the threshold level (Step S112: NO), the process goes to Step S115.

In Step S113, it is judged whether or not the downstream node Nn of the broadcast station 10 exists. In a case where the downstream node Nn of the broadcast station 10 exists (Step S113: YES), a switch instruction message for instructing to switch to a first mode is sent to the downstream node Nn (Step S114), and the process returns to Step S104. In a case where the downstream node Nn does not exist in the broadcast station 10 (Step S113: NO), the process returns to Step S104.

In Step S115, it is judged whether or not a connection destination candidate search request message is received from the node Nn. In a case where the connection destination candidate search request message is received (Step S115: YES), the process goes to Step S116. In a case where the connection destination candidate search request message is not received (Step S115: NO), the process goes to Step S120.

In Step S116, a reception amount of the connection destination candidate search request message per unit time is calculated and temporarily memorized.

In Step S117, it is judged whether or not the broadcast station 10 is a node which meets the restriction described in the connection destination candidate search request message (e.g. the node Nn is connectable to downstream of the broadcast station 10). In a case where the broadcast station 10 is a node which meets the above restriction (Step S117: YES), the connection destination candidate response message is sent to the node Nn of a search source of the connection destination candidate (Step S118), the process goes to Step S119. In a case where the own node dose not meet the above restriction (Step S117: NO), the connection destination candidate response message is not sent to the node Nn of a search source of the connection destination candidate, and the process goes to Step S119.

In Step S119, the number of relay pops of the connection destination candidate search request message is added +1, and transferred to the downstream node Nn. The process returns to Step S104.

In Step S120, it is judged whether or not it becomes a trigger of sending the advertisement message. In a case where it becomes the trigger of sending the advertisement message (Step S120: YES), the process goes to Step S121. In a case where it does not become the trigger of sending the advertisement message (Step S120: NO), the process goes to Step S123. For example, the advertisement message is periodically (e.g. every one minute) sent. Reception process of the advertisement message from the downstream node Nn is not shown.

In Step S121, it is judged whether or not a downstream node Nn of the broadcast station 10 exists. In a case where the downstream node Nn of the broadcast station 10 exists (Step S121: YES), the above advertisement message is sent to the downstream node Nn (Step S122), and the process returns to Step S104. In a case where the downstream node Nn of the broadcast station 10 does not exist (Step S121: NO), the process returns to Step S104.

In Step S123, it is judged whether or not a reception amount of the connection destination candidate search request message per unit time (the reception amount calculated and memorized in Step S116) exceeds the threshold level. In a case where the reception amount of the connection destination candidate search request message exceeds the threshold level (Step S123: YES), the process goes to Step S124. In a case where the reception amount of the connection destination candidate search request message does not exceed the threshold level (Step S123: NO), the process returns to Step S104.

In Step S124, it is judged whether or not the downstream node Nn connected to the broadcast station 10 is a search origin node. In a case where the downstream node Nn is not the search origin node (Step S124: NO), a search origin node promotion request message is sent to the downstream node Nn (Step S125), and the process returns to Step S104. In a case where the downstream node Nn is the search origin node (Step S124: YES), the process returns to Step S104 without sending the search origin node promotion request message.

Here, the reception process of the role finish message from the downstream node Nn is not shown.

(Process of Connection Destination Introduction Server 20)

Figure 18:
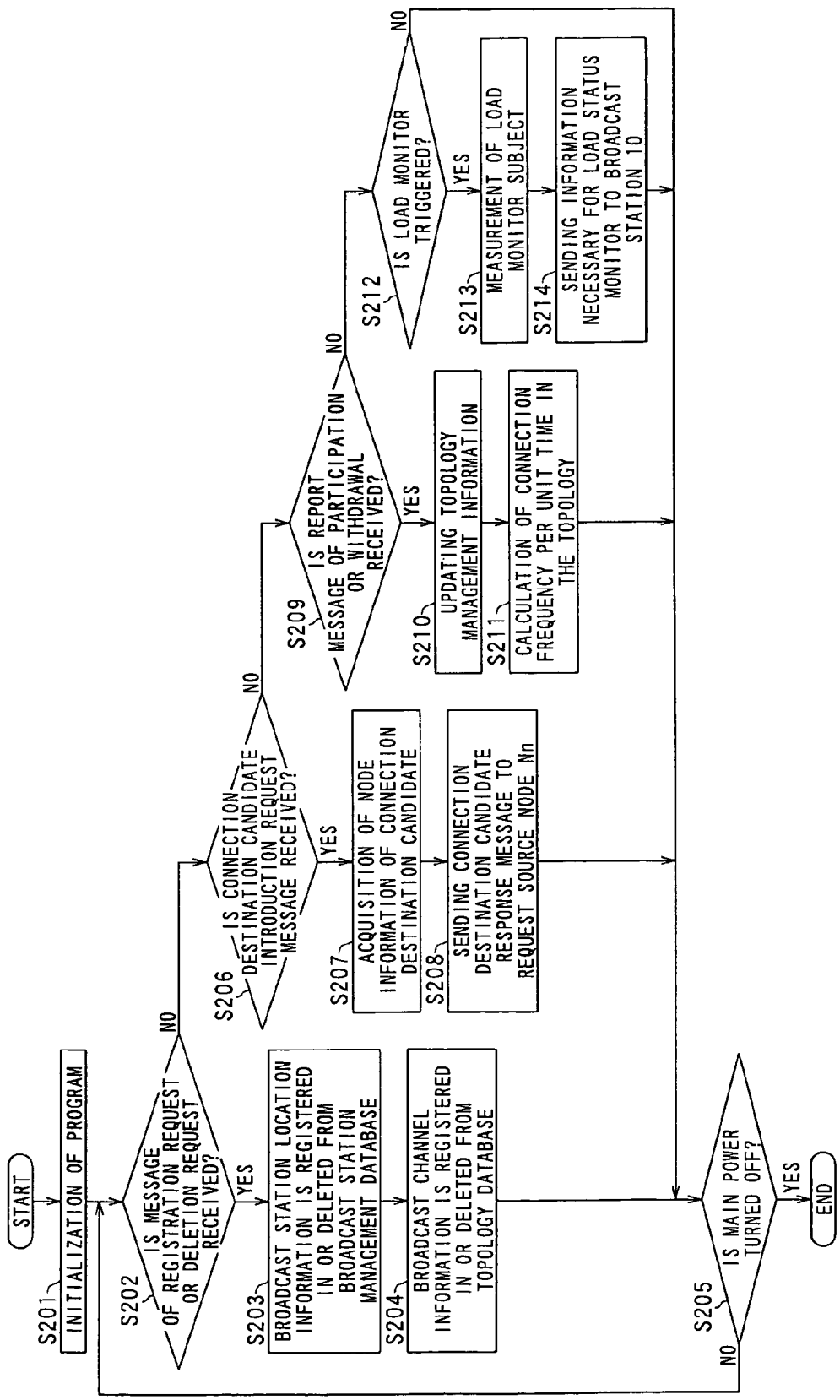
FIG. 18 is a flowchart of a process carried out by CPU 204 in the connection destination introduction server 20.

Next, with reference to FIG. 18, a process of CPU 204 in a connection destination introduction server 20 is explained.

FIG. 18 is a flowchart showing a process carried out by the CPU 204 in the connection destination introduction server 20.

A process of FIG. 18 starts by turning on a main power 201 to activate the connection destination introduction server 20. When the process starts, various programs in the connection destination introduction server 20 are initialized in Step S201.

In Step S202, it is judged whether or not a registration request message or a deletion request message is received from the broadcast station 10. In a case where the registration request message or the deletion request message is received (Step S202: YES), the process goes to Step S203. In a case where the registration request message or the deletion request message is not received (Step S202: NO), the process goes to Step S206.

In Step S203, location information and the like included in the above registration request message are registered in the broadcast station management database in correspondence with broadcast channel information. Or the location information and the like included in the above deletion request message are deleted from the broadcast station management database.

In Step S204, broadcast channel information corresponding to the broadcast station 10 registering the location information is registered in the topology database. Or the broadcast channel information is deleted from the topology database.

In Step S205, it is judged whether or not the connection destination introduction service finishes. In a case where the connection destination introduction service finishes (Step S205: YES), the process finishes. In a case where the connection destination introduction service does not finish (Step S205: NO), the process returns Step S202.

In Step S206, it is judged whether or not the connection destination candidate introduction request message is received from the node Nn. In a case where the connection destination candidate introduction request message is received (Step S206: YES), the process goes to Step S207. In a case where the connection destination candidate introduction request message is not received (Step S206: NO), the process goes to Step S209.

In Step S207, a connection destination candidate is searched from the topology management information of the topology database, and node information of one or more pieces of the searched node information of the connection destination candidate.

In Step S208, the connection destination candidate response message including the node information of thus acquired connection destination candidate is returned to the node Nn of sending source of the connection destination candidate introduction request message. The process returns to Step S205.

In Step S209, it is judged whether or not a topology participation report message or withdrawal report message is received from the node Nn. In a case where the topology participation report message or withdrawal report message is received (Step S209: YES), the process goes to Step S210. In a case where the topology participation report message or withdrawal report message is not received (Step S209: NO), the process goes to Step S212.

In Step S210, topology management information registered in the topology database according to the topology participation report message or withdrawal report message is updated. In this way, the topology variation is reflected.

In Step S211, a connection frequency per unit time in the topology (tendency of increasing the node connection frequency) is calculated and temporarily memorized. The process returns to Step S205.

In Step S212, it is judged whether or not load is caused to be monitored. In a case where it becomes the load is caused to be monitored (Step S212: YES), the process goes to Step S213. In a case where the load is not caused to be triggered (Step S212: NO), the process returns to Step S205.

In Step S213, subject of the load to be monitored is measured. For example, information related to load, such as a CPU usage rate, the tendency of increasing the node connection frequency per unit time, and packet reception rate of the router device is periodically measured (e.g. every one minute).

Then in Step S214, the above information (e.g. measure value) necessary for monitoring the above load status is sent to the broadcast station 10. Here, when it is confirmed that a load status before measuring a subject to be load-monitored is normal and a status after the measurement is excessive, the information indicating the excessive load status may be sent to the broadcast station 10 as information necessary for monitoring the load status. When it is confirmed that a load status before measuring a subject to be load-monitored is excessive and a status after the measurement is normal, the information indicating a recovery of the excessive load status maybe sent to the broadcast station 10 as information necessary for monitoring the load status to the broadcast station 10.

According to the above embodiment described above, in a case where a monitor level of the load status exceeds the threshold level, the broadcast station 10 monitors a load status of the connection destination introduction server 20 and broadcasts to subsequently transfer the switch instruction message for instructing respective nodes Nn to switch selection from the above first mode (control mode based on hybrid P2P) to the above second mode (control mode based on pure P2P), from the upstream node Nn to the downstream node Nn through topology broadcast route. Such the configuration enables respective nodes Nn to switch from the above first mode to the above second mode with a predictor of an abnormal status as a trigger, to avoid excessive load on the center equipment. Therefore, it is possible to carry out the most appropriate topology control while utilizing respective advantages of the ALM control method based on hybrid type P2P and the ALM control method based on pure type P2P.

Further, for example, in a case where the monitor level of the load status of the connection destination introduction server 20 falls below the threshold level for a predetermined time, the switch instruction message of giving the instruction to switch selection from the above second mode to the above first mode is broadcasted to the respective nodes Nn participating in the tree topology. Such the configuration enables respective nodes Nn to return the first mode promptly and carry out the most appropriate topology control. Specifically in a case where a broadcast service over 10,000 nodes is operated, influence of the topology variation on the center equipment remarkably appears. Therefore, it is expected to be effective for operating server equipment safely.

Further, according to the second mode (control mode based on pure P2P) in the above embodiment, it is possible to search the reconnection destination candidate effectively among respective nodes Nn without loading burden on the connection destination introduction server 20. Besides it is possible to disperse process burden of massages for searching the reconnection destination candidate in the search origin node because search origin node is increased or decreased depending on message amount.

Further, the advertisement message including location information of the search origin node is periodically broadcasted through the broadcast route of the tree topology. Such the configuration enables respective nodes Nn to acquire location information of the latest search origin node. Therefore, this can be used in the second mode promptly.

Meanwhile, although in the above embodiment, a method explained using FIGS. 3 to 5 is applied as the second mode (control mode based on pure P2P), the other method may be applicable. For example, respective nodes Nn exchange node information among neighbor nodes (node Nn in a narrow range of several hops) and memorize. In a case of reconnection to the other node Nn to be upstream one, the above memorized node information may be used.

According to the present invention, the broadcast device monitors a load status of the server device and broadcasts so as to subsequently transfer switch instruction information for instructing respective node devices to switch selection to the second mode, from a node device at an upper hierarchy level to a node device at a lower hierarchy level, in a case where the monitor level of the load status exceeds the threshold level. Such the configuration enables respective node devices to switch from the first mode to the second mode, for example, with a predictor of an abnormal status as a trigger, to avoid excessive load on the center equipment. Therefore, it is possible for the broadcast device to carry out the most appropriate topology control while utilizing respective advantages of the ALM control method based on hybrid type P2P and the ALM control method based on pure type P2P.

The present invention is not confined to the configuration listed in the foregoing embodiments, but it is easily understood that the person skilled in the art can modify such configurations into various other modes, within the scope of the present invention described in the claims.

What is claimed is:

1. A broadcast device in a tree-type broadcast system formed by participation of a plurality of node devices that forms a plurality of hierarchy levels, wherein the broadcast device is located at a top position of the tree-type broadcast system and the node devices are connected in a tree-like shape through a communication circuit to enable content data broadcasted by the broadcast device are sequentially transferred from the node devices in an upper hierarchy level to the node devices in a lower hierarchy level, the node devices comprising:

a mode selection unit configured to select either one of modes of a first mode and a second mode, the first mode determining a reconnection destination by acquiring node information to be the reconnection destination from a server device which manages a connection mode between the node devices in the tree-type broadcast system, the second mode determining a reconnection destination by acquiring node information of the node device to be the reconnection destination candidate from at least one of the node devices participating in the tree-type broadcast system; and a reconnection processing unit configured to determine the reconnection destination by acquiring the node information according to the mode selected by the mode selection unit, the broadcast device in the tree-type broadcast system comprising:

a load status monitor unit configured to monitor a load status of the server device; and a switch instruction information transmission unit configured to transmit switch instruction information for instructing the node devices to switch selection to the second mode, in response to determining that a monitor level of the load status reaches a threshold level.

2. The broadcast device according to claim 1, wherein
in response to determining that the monitor level of the load status becomes lower than the threshold level, the switch instruction information transmission unit transmits switch instruction information for instructing the node devices to switch selection to the first mode.

3. A tree-type broadcast system formed by participation of a plurality of node devices that forms a plurality of hierarchy levels, wherein the broadcast device is located at a top position of the tree-type broadcast system and the node devices are connected in a tree-like shape through a communication circuit to enable content data broadcasted by the broadcast device are sequentially transferred from the node devices in an upper hierarchy level to the node devices in a lower hierarchy level, the node devices including:
  a mode selection unit configured to select either one of modes of a first mode and a second mode, the first mode determining a reconnection destination by acquiring node information to be the reconnection destination from a server device which manages a connection mode between the node devices in the tree-type broadcast system, the second mode determining a reconnection destination by acquiring node information of the node device to be the reconnection destination candidate from at least one of the node devices participating in the tree-type broadcast system; and
  a reconnection processing unit configured to determine the reconnection destination by acquiring the node information according to the mode selected by the mode selection unit,
  the broadcast device in the tree-type broadcast system comprising:
  a load status monitor unit configured to monitor a load status of the server device; and
  a switch instruction information transmission unit configured to transmit switch instruction information for instructing the node devices to switch selection to the second mode, in response to determining that a monitor level of the load status reaches a threshold level.

4. The tree-type broadcast system according to claim 3, wherein
in response to determining that the monitor level of the load status becomes lower than the threshold level, the switch instruction information transmission unit transmits switch instruction information for instructing the node devices to switch selection to the first mode.

5. The tree-type broadcast system according to claim 3, wherein the node devices further comprising:
  a memory unit configured to memorize node information of the node device which is a sending destination of search information for searching the node device being a candidate of reconnection destination; and
  a search information transmission unit configured to transmit the search information to the node device in accordance with the node information memorized in the memory unit, in response to selecting the second mode at a time of the reconnection,
  wherein the search information sent by the search information transmission unit is sequentially transferred from the node device in the upper hierarchy level to the node device in the lower hierarchy level and, the node device further comprising:
  a determining unit configured to determine whether the node device is connectable to the lower hierarchy level of the node device receiving the search information; and
  a node information transmission unit configured to transmit the node information of the node device receiving the search information as a reconnection candidate to the node device of the sending source of the search information, in response to determining that the node device is connectable, by the determining unit.

6. The tree-type broadcast system according to claim 5, wherein
the broadcast device comprising:
  a node information transmission unit configured to transmit the node information of the node device of the sending destination of the search information at a predetermined time interval to thereby enable sequential transfer from the node devices in the upper hierarchy levels to the lower hierarchy levels.

7. The tree-type broadcast system according to claim 6, wherein
the node device receiving the node information of the node device being the sending destination of the search information memorizes the node information onto the memory unit.

8. A non-transitory computer-readable storage medium that stores a computer-executable program for a broadcast device included in a tree-type broadcasting system formed by participation of a plurality of node devices that forms a plurality of hierarchy levels, wherein a broadcast device is located at a top position of the tree-type broadcast system and the node devices are connected in a tree-like shape through a communication circuit to enable content data broadcasted by the broadcast device are sequentially transferred from the node devices in an upper hierarchy level to the node devices in a lower hierarchy level, the node devices comprising: a mode selection unit configured to select either one of modes of a first mode and a second mode, the first mode determining a reconnection destination by acquiring node information to be the reconnection destination from a server device which manages a connection mode between the node devices in the tree-type broadcast system, the second mode determining a reconnection destination by acquiring node information of the node device to be the reconnection destination candidate from at least one of the node devices participating in the tree-type broadcast system; and a reconnection processing unit configured to determine the reconnection destination by acquiring the node information according to the mode selected by the mode selection unit,
  the program comprising:
    instructions for monitoring a load status of the server device; and
    instructions for transmitting switch instruction information for instructing the node devices to switch selection to the second mode, in response to determining that a monitor level of the load status reaches a threshold level.

9. A non-transitory computer-readable storage medium that stores a computer-executable program for a node device included in the tree-type broadcasting system formed by participation of a plurality of node devices that forms a plurality of hierarchy levels, wherein a broadcast device is located at a top position of the tree-type broadcast system and the node devices are connected in a tree-like shape through a communication circuit to enable content data broadcasted by the broadcast device are sequentially transferred from the node devices in an upper hierarchy level to the node devices in a lower hierarchy level, the program comprising:
instructions for selecting either one of modes of a first mode and a second mode, the first mode determining a reconnection destination by acquiring node information to be the reconnection destination from a service device which manages a connection mode between the node devices in the tree-type broadcast system, the second mode determining a reconnection destination by acquiring node information of the node device to be the reconnection destination candidate from at least one of the node devices participating in the tree-type broadcast system, in accordance with switch instruction information for instructing the node device to switch selection, the switch instruction information being sent from the broadcast device in response to a monitor level of a load status of the server device; and
instructions for determining the reconnection destination by acquiring the node information according to the selected mode.

10. A method of switching a mode in a tree-type broadcast system formed by participation of a plurality of node devices that forms a plurality of hierarchy levels, wherein the broadcast device at a top position of the tree-type broadcast system and the node devices are connected in a tree-like shape through a communication circuit to thereby enable content data broadcasted by the broadcast device are sequentially transferred from the node device in an upper hierarchy level to the node device in a lower hierarchy level, the method comprising:
selecting either one of modes of a first mode and a second mode by the node device, the first mode determining a reconnection destination by acquiring node information of the node device to be the reconnection candidate from a server device which manages a connection mode between the node devices in the tree-type broadcast system, the second mode determining a reconnection destination by acquiring node information of the node device to be the reconnection destination candidate from at least one of the node devices participating in the tree-type broadcast system;
determining the reconnection destination by acquiring the node information according to the selected mode by the node device,
monitoring a load status of the server device by the broadcast device; and
transmitting switch instruction information for instructing the node devices to switch selection to the second mode by the broadcast device, in response to determining that a monitor level of the load status reaches a threshold level.

* * * * *